US012688859B2

(12) United States Patent
Ragot et al.

(10) Patent No.: US 12,688,859 B2
(45) Date of Patent: Jul. 21, 2026

(54) CODING AND DECODING OF SPHERICAL COORDINATES USING AN OPTIMIZED SPHERICAL QUANTIZATION DICTIONARY

(71) Applicant: ORANGE, Issy les Moulineaux (FR)

(72) Inventors: Stéphane Ragot, Chatillon Cedex (FR); Mohamed Yaoumi, Chatillon Cedex (FR)

(73) Assignee: ORANGE, Issy les Moulineaux (FR)

( * ) Notice: Subject to any disclaimer, the term of this patent is extended or adjusted under 35 U.S.C. 154(b) by 135 days.

(21) Appl. No.: 18/838,029

(22) PCT Filed: Feb. 13, 2023

(86) PCT No.: PCT/EP2023/053413
§ 371 (c)(1),
(2) Date: Aug. 13, 2024

(87) PCT Pub. No.: WO2023/152348
PCT Pub. Date: Aug. 17, 2023

(65) Prior Publication Data
US 2025/0140273 A1 May 1, 2025

(30) Foreign Application Priority Data
Feb. 14, 2022 (FR) ....................................... 2201286

(51) Int. Cl.
*G10L 19/038* (2013.01)
*G10L 19/035* (2013.01)

(52) U.S. Cl.
CPC .......... *G10L 19/038* (2013.01); *G10L 19/035* (2013.01)

(58) Field of Classification Search
CPC ................. G10L 19/038; G10L 19/035; G10L 2019/0004; G10L 19/008; H03M 7/3082; H04N 19/94
See application file for complete search history.

(56) References Cited

U.S. PATENT DOCUMENTS

2020/0265851 A1 8/2020 Fuchs et al.

FOREIGN PATENT DOCUMENTS

| | | | |
|---|---|---|---|
| GB | 2572761 A * | 10/2019 | ........... G10L 19/008 |
| WO | 2020016479 A1 | 1/2020 | |
| WO | 2021019126 A1 | 2/2021 | |

OTHER PUBLICATIONS

International Search Report dated Apr. 13, 2023 for corresponding International Application No. PCT/EP2023/053413, filed Feb. 13, 2023.

(Continued)

*Primary Examiner* — Daniel C Washburn
*Assistant Examiner* — Penny L Caudle
(74) *Attorney, Agent, or Firm* — David D. Brush; Westman, Champlin & Koehler, P.A.

(57) ABSTRACT

A method for coding or decoding a spatial direction of a sound source, in which a spherical quantization dictionary is defined on a 3D sphere by coding elevation and azimuth, giving at least one coded elevation index (i) on a number of elevation levels ($N_\phi$) and a number of points per level ($Ny_\theta(i)$) determined on the basis of two successive cumulative cardinality values (cumN (i), cumN (i−1)), the cumulative cardinality value (cumN(i)) being representative of a number of points proportional to a total number of points and according to the area of a spherical region comprising at least one region delimited by the upper horizontal plane ($\phi=(i+½)\delta_\phi$) of the positive elevation level of the coded elevation index (i) and a lower horizontal plane of the sphere.

15 Claims, 7 Drawing Sheets

(56) References Cited

OTHER PUBLICATIONS

Written Opinion of the International Searching Authority dated Apr. 13, 2023 for corresponding International Application No. PCT/EP2023/053413, filed Feb. 13, 2023.
3GPP Tdoc S4-180087: "On IVAS audio formats for mobile capture devices". Source: Nokia Corporation. 3GPP TSG-SA4#97 meeting, Feb. 5-9, 2018, Fukuoka, Japan.
3GPP Tdoc S4-191167 (Oct. 2019), "Description of the IVAS MASA C Reference Software", Source: Nokia Corporation, 3GPP TSG-SA4#106 meeting, Oct. 21-25, 2019, Busan, Republic of Korea.
V. Pulkki, "Spatial sound reproduction with directional audio coding", Journal of the Audio Engineering Society, vol. 55, No. 6, pp. 503-516, 2007.
3GPP TS 26.445 V15.3.1 (Jul. 2020), 3rd Generation Partnership Project; Technical Specification Group Services and System Aspects; Codec for Enhanced Voice Services (EVS); Detailed Algorithmic Description (Release 15)—pp. 1-24.
3GPP TS 26.445 V15.3.1 (Jul. 2020), 3rd Generation Partnership Project; Technical Specification Group Services and System Aspects; Codec for Enhanced Voice Services (EVS); Detailed Algorithmic Description (Release 15) —pp. 267-408.
3GPP TS 26.445 V15.3.1 (Jul. 2020), 3rd Generation Partnership Project; Technical Specification Group Services and System Aspects; Codec for Enhanced Voice Services (EVS); Detailed Algorithmic Description (Release 15)—pp. 408-443.
3GPP TS 26.445 V15.3.1 (Jul. 2020), 3rd Generation Partnership Project; Technical Specification Group Services and System Aspects; Codec for Enhanced Voice Services (EVS); Detailed Algorithmic Description (Release 15)—pp. 519-607.
3GPP TS 26.445 V15.3.1 (Jul. 2020), 3rd Generation Partnership Project; Technical Specification Group Services and System Aspects; Codec for Enhanced Voice Services (EVS); Detailed Algorithmic Description (Release 15)—pp. 608-659.
International Preliminary Report on Patentability and English translation of the Written Opinion of the International Searching Authority dated Apr. 13, 2023 for corresponding International Application No. PCT/EP2023/053413, filed Feb. 13, 2023.
Matschkal B. et al: "Spherical Logarithmic Quantization", IEEE Transactions on Audio, Speech and Language Processing, IEEE, US, vol. 18, No. 1, Jun. 2, 2009 (Jul. 2, 2009), pp. 126-140.
Bin Cheng et al., "A General Compression Approach to Multi-Channel Three-Dimensional Audio", IEEE Transactions on Audio, Speech and Language Processing, IEEE, US, vol {0} 21, No. {0} 8, Apr. 25, 2013 (Apr. 25, 2023), p. 1676-1688, XP011519776.

* cited by examiner

CODING AND DECODING OF SPHERICAL COORDINATES USING AN OPTIMIZED SPHERICAL QUANTIZATION DICTIONARY

CROSS-REFERENCE TO RELATED APPLICATIONS

This application is a Section 371 National Stage Application of International Application No. PCT/EP2023/053413, filed Feb. 13, 2023, and published as WO 2023/152348 A1 on Aug. 17, 2023, not in English, which claims priority to French Patent Application No. 2201286, filed Feb. 14, 2022, the contents of which are incorporated herein by reference in their entireties.

FIELD OF THE DISCLOSURE

The present invention relates to spherical vector quantization applied to the coding/decoding of sound data, in order to code source directions of arrival (abbreviated to "DoA") that are generally represented by spherical coordinates (for example azimuth and elevation, at a predetermined distance).

BACKGROUND OF THE DISCLOSURE

Encoders/decoders (hereinafter called "codecs") that are currently used in mobile telephony are mono (a single signal channel to be rendered on a single loudspeaker). The 3GPP EVS (for "Enhanced Voice Services") codec makes it possible to offer "Super-HD" quality (also called "High Definition Plus" or HD+ voice) with a super-wideband (SWB) audio band for signals sampled at 32 or 48 kHz or full band (FB) audio band for signals sampled at 48 kHz; the audio bandwidth is 14.4 to 16 kHz in SWB mode (9.6 to 128 kbit/s) and 20 kHz in FB mode (16.4 to 128 kbit/s).

The next quality evolution in conversational services offered by operators should consist of immersive services, using terminals such as smartphones equipped with multiple microphones or remote presence or 360° video spatialized audio-conferencing or video-conferencing equipment, or even "live" audio content sharing equipment, with spatialized 3D sound rendering that is much more immersive than simple 2D stereo rendering. With the increasingly widespread use of listening on a mobile telephone with an audio headset and the onset of advanced audio equipment (accessories such as a 3D microphone, voice assistants with acoustic antennas, virtual reality or augmented reality headsets, etc.), capturing and rendering spatialized sound scenes is now widespread enough to offer an immersive communication experience.

To this end, the future 3GPP standard "IVAS" (for "Immersive Voice And Audio Services") is proposing to extend the EVS codec to immersive audio by accepting, as codec input format, at least the spatialized sound formats listed below (and their combinations):

- stereo or 5.1 multichannel format (channel-based), in which each channel feeds a loudspeaker (for example L and R in stereo or L, R, Ls, Rs and C in 5.1);
- object format (object-based), in which sound objects are described as an audio signal (generally mono) associated with metadata describing the attributes of this object (position in space, spatial width of the source, etc.),
- ambisonic format (scene-based), which describes the sound field at a given point, generally captured by a spherical microphone or synthesized in the domain of spherical harmonics.

There is also the issue of potentially considering other input formats such as the format called MASA (Metadata assisted Spatial Audio), which corresponds to a parametric representation of a sound pick-up on a mobile telephone equipped with multiple microphones. This format is studied in more detail below.

The signals to be processed by the encoder/decoder take the form of successions of blocks of sound samples called "frames" or "subframes" below.

Furthermore, below, mathematical notations follow the following convention:

- Scalar: s or N (lower-case for variables or upper-case for constants)
- Vector: q (lower-case, bold and italicized)
- Matrix: M (upper-case, bold and italicized)

Hereinafter, we will denote the sphere $\delta_n$ of radius r in dimension n+1 defined as $$\mathbb{S}_n = \left\{x = (x_1, \ldots, x_{n+1}) \in \mathbb{R}^{n+1} \middle| \|x\| = \sqrt{x_1^2 + \ldots + x_{n+1}^2} = r\right\}$$

where ||•|| denotes the Euclidean norm. When the radius r is not specified, it will be assumed that r=1 (unit sphere). The focus here is on the case of dimension 3, where n=2. A reminder will be given here of the definition of the spherical coordinates in dimension 3. For a point (x, y, z) in dimension 3, there are generally at least two classical conventions of spherical coordinates denoted (r, ϕ, θ):

- the geographical convention: x=r cos ϕ cos θ, y=r cos ϕ sin θ, z=r sin ϕ with r≥0, −π/2≤ϕ≤π/2 and −π≤θ≤π
- the physical convention: x=r sin ϕ cos θ, y=r sin ϕ sin θ, z=r cos ϕ with r≥0, 0≤ϕ≤π and −π≤θ≤π

The angles ϕ, θ are defined here in radians, without loss of generality.

The radius r and the azimuth (or longitude) θ are the same in these two definitions, but the angle ϕ differs depending on whether it is defined with respect to the horizontal plane 0xy (elevation or latitude over the interval [−π/2, π/2]) or based on the axis 0z (colatitude or polar angle over the interval [0, π]). The azimuth θ may be defined over an interval [−π,π], and, in equivalent fashion, it may be defined over [0,2π] by a simple operation of modulo 2π. Hereinafter, the same angular coordinates will preferably be represented in degrees, but other units may be used. It should be noted that the symbols may be different in the literature (for example φ instead of ϕ) and/or swapped (for example θ for colatitude and φ for longitude). Hereinafter, the convention that is adopted will preferably be that of using the elevation and azimuth pair, but the invention is applicable to all variant definitions of spherical coordinates.

What are of interest in the invention are exemplary embodiments of spherical vector quantization applied to the coding of 3D directions of audio sources. The invention may also be applied to other audio formats and to other signals (for example images or 360 video) in which spherical data in dimension 3 are to be coded.

The principles of DiRAC (Directional Audio Coding) will be recalled below. In some variants, it is possible to apply the invention to other coding schemes, in particular for transform-based audio coding.

DiRAC coding is described for example in the article V. Pulkki, Spatial sound reproduction with directional audio coding, Journal of the Audio Engineering Society, vol. 55, no. 6, pp. 503-516, 2007. In that document, mapping is carried out through directional analysis in order to find a direction (DoA) for each sub-band. This DoA is supplemented by a "diffuseness" parameter, thereby giving a parametric description of the sound scene. The multi-channel input signal is coded in the form of transport channels (typically a mono or stereo signal obtained by reducing multiple picked-up channels) and spatial metadata (DoA and "diffuseness" for each sub-band).

FIG. 1 describes one exemplary implementation of DiRAC coding. In this example, the coding uses a reduction in the number of channels (downmixing-block 100), where coding (block 110) is carried out for example on only one channel with a mono codec—for example 3GPP EVS at a given bit rate (24.4 kbit/s). The input signal is also decomposed (block 120) into frequency sub-bands, for example by a filter bank or by a short-time Fourier transform. A division into Bark bands, for example 24 sub-bands that are distributed into frequencies on the Bark scale known from the prior art, will be assumed here. In each frame and each sub-band, the DiRAC coding typically estimates two parameters (block 130)—to lighten the notations, no frame index or sub-bands are used for the various parameters: the direction of the dominant source (DoA) in terms of elevation ($\phi$) and azimuth ($\theta$), and "diffuseness" $\psi$ as described in the above-mentioned article by Pulkki. The DoA is generally estimated by way of an active intensity vector with a temporal mean; in some variants, it will be possible to implement other methods for estimating $\phi$, $\theta$, $\psi$.

The DoA is coded (block 140) on a predetermined number of bits (for example 7 bits) per pair ($\phi$, $\theta$) in each frame and each sub-band. The "diffuseness" $\psi$ is a parameter between 0 and 1, and is coded here (block 150) by scalar quantization (for example on 6 bits). In the example given, the spatial metadata coding budget is therefore 24×(7+6)=312 bits per frame, that is to say 15.6 kbit/s, for a global budget of 24.4+15.6=40 kbit/s. The "downmix" signal coding bitstream and the coded spatial parameters are multiplexed (block 160) so as to form the bitstream of each frame.

FIG. 2 illustrates one exemplary embodiment of a DiRAC decoder. After demultiplexing the bitstream (block 200), the "downmix" signal is decoded (block 210). The spatial parameters are decoded (block 250 and block 270). The decoded signal $\hat{s}$ is then decomposed into times/frequencies (block 220 identical to block 120) so as to spatialize it as a point source (plane wave) in the block (block 260) that generates a spatialized 1st-order ambisonic signal as follows:

$$X(\hat{\phi}, \hat{\theta}) = \begin{bmatrix} 1 \\ \cos\hat{\phi}\cos\hat{\theta} \\ \cos\hat{\phi}\sin\hat{\theta} \\ \sin\hat{\phi} \end{bmatrix} \cdot \hat{s}$$

Based on the decoded signal, a decorrelation is carried out (block 230) so as to have a "diffuse" version (corresponding to a maximum source width); this decorrelation also achieves an increase in the number of channels so as, at the output of block 230, to obtain a 1st-order ambisonic signal with 4 channels (W, Y, Z, X). The decorrelated signal is decomposed into times/frequencies (block 240). The signals resulting from blocks 240 and 260 are combined (block 275) by sub-band, after applying a scaling factor (blocks 273 and 274) obtained from the decoded "diffuseness" (blocks 271 and 272); this adaptive mixing makes it possible to "dose" the source width and the diffuse character of the sound field in each sub-band. The mixed signal is converted into the time domain (block 280) by a filter bank or an inverse short-time transform.

The directions of sources in the DiRAC format are therefore represented in the form of 3D spherical data, typically in the form of spherical coordinates (azimuth, elevation) according to the geographical convention. In this context, there is a need to represent this DoA information effectively, this being able to be formulated as a vector quantization problem on the sphere $\mathbb{S}_2$ in dimension 3.

Another example of a parametric format for immersive audio is the MASA format described in the contribution "3GPP Tdoc S4-180087: On IVAS audio formats for mobile capture devices. Source: Nokia Corporation". The principle is summarized in FIG. 3. It will be assumed that a mobile telephone is equipped with multiple microphones (for example 4 microphones) placed at predetermined locations (for example two at the bottom of the telephone, one at the top of the telephone and a last one on the back shell of the telephone). These microphones are seen as grouped together in block 300, which provides as many signals (channels) as there are microphones-possibly with additional information such as the placement or the characteristics of the microphones.

Block 310 carries out parametric analysis of the signals coming from block 300, using a similar DiRAC approach, which provides transport channels and metadata. This MASA analysis is generally proprietary and selected by the manufacturer of the telephone. The number of transport channels is typically limited to 1 (mono) or 2 (stereo), and may be defined simply by selecting the primary microphone in the mono case or two opposite microphones (for example one at the bottom and another at the top of the telephone) in the stereo case. One example of a MASA metadata format is described for example in the contribution "3GPP Tdoc S4-191167 (October 2019), Description of the IVAS MASA C Reference Software, Source: Nokia Corporation". What is of particular interest here is the parameter called "Direction index", which is coded on 16 bits and described as follows in that document: "Direction of arrival of sound in a time-frequency interval; Spherical representation with an accuracy of around 1 degree; Interval of values: "covers all directions with an accuracy of around 1°".

This therefore involves a source direction (DoA) according to a 3D spherical grid whose (angular) resolution is close to 1 degree. This DoA information is provided for each frame and frequency sub-band by a DoA estimate (block 311). Block 312 (inside block 310) therefore codes DoA information coded on 16 bits per DoA.

Block 320 represents the IVAS codec, which is not yet available as a 3GPP standard and is still under development. However, it has been proposed in the 3GPP for the MASA parametric format defining transport channels and metadata (including DoA per frame and sub-band) to be an input format of the IVAS codec. The (future) IVAS encoder should then implement a step of decoding the DoA information (block 321) in order to be able to fully exploit this DoA information and compress it at a lower rate. The implementation details regarding the compression of an input MASA format into an IVAS bitstream at a given rate and the associated decoding are beyond the scope of this invention, but it may for example be noted that the MASA format is based on an extended principle of DiRAC coding, the transport channels may be coded separately (by a mono core codec) or together (by a stereo core codec), and the metadata may be coded at a rate lower than in the MASA input format.

In general, any discretization of the sphere $\delta_2$ may be used as a spherical vector quantization dictionary. However, without any particular structure, searching for the nearest neighbor and indexing in this dictionary may prove costly to implement, above all when the coding rate of the DoA information is excessively high (for example 16 bits per 3D vector indicating a DoA).

One example of a 3D spherical grid is given in the Appendix and in the source code attached to the contribution "3GPP Tdoc S4-191167 (October 2019), Description of the IVAS MASA C Reference Software, Source: Nokia Corporation".

The spatial direction of an audio source in a given frame and a given sub-band of a WMASA format proposal is represented by two angles: azimuth and elevation. The notations used hereinafter are $\phi$ for elevation and $\theta$ for azimuth, while the opposite convention is used in the document 3GPP Tdoc S4-191167.

That document gives a definition of a spherical grid as follows:

The grid consists of $N_{tot}=2^{16}-208=65328$ points discretizing the surface of a 3D sphere of radius 1; each point is represented by a single index on 16 bits. This grid is defined by three stored elements:

- a number $N_\phi=122$ of discrete values to code the positive elevation (that is to say $|\phi|$)
- a scalar quantization dictionary for elevation (for the Northern hemisphere corresponding to $|\phi|$): $\{\hat{\phi}(i), i=0, \ldots, N_\phi-1\}$
- a number of points (size of the dictionary) $N_\theta(i)$, $i=0, \ldots, 121$, to code the azimuth, at a given discrete elevation of index i The precise definition of the grid is detailed below:

Each point on the 3D grid is given by a coded elevation value-decomposed into a coded absolute value $\hat{\phi}(i)$ where $i=0, \ldots, N_\phi-1$ and a sign (+1 or −1)—and a coded azimuth value $\hat{\theta}(i,j)$, $j=0, \ldots, N_\theta(i)-1$ which depends on the elevation index i. The coded elevation value is $\hat{\phi}(0)=0$ for i=0 and $\pm\hat{\phi}(i)$ for $i=1, \ldots, N_\phi-1$.

The number $N_\phi=122$ thus corresponds to the number of (coded) elevations with a positive value (including the value zero); the elevation scalar quantization dictionary therefore comprises $2N_\phi-1=243$ coded values taking into account the sign, and these values may be ordered from the North pole to the South pole as:

$+\hat{\phi}(N_\phi-1)$ corresponding to the North pole
$+\hat{\phi}(N_\phi-2)$
. . .
$+\hat{\phi}(1)$ corresponding to the first layer above the equator
$\hat{\phi}(0)=0$ corresponding to the equator
$-\hat{\phi}(1)$ corresponding to the first layer below the equator
. . .
$-\hat{\phi}(N_\phi-2)$
$-\hat{\phi}(N_\phi-1)$ corresponding to the South pole.

The elevation $\phi$ is coded by uniform scalar quantization over the interval [−88.65, 88.65] degrees with, in addition, two codewords for the poles (±90 degrees). The value 0 degrees (corresponding to the equator) is contained in the dictionary. The quantization step is set to $$\delta_\phi = \sin^{-1}\frac{2\sqrt{3}\sin\frac{\pi}{n(1)}}{6\sqrt{1-\left(\sin\frac{\pi}{n(1)}\right)^2}} + \sin^{-1}\left(\frac{2\sqrt{3}}{3}\sin\frac{\pi}{n(1)}\right)$$

thereby giving $\delta_\phi \approx 0.7388$ degrees. This therefore gives $\hat{\phi}(i)=i\delta_\phi$ for $i=0, \ldots, N_\phi-2$ and $\hat{\phi}(i)=90$ for $i=N_\phi-1$.

The size $N_\theta(i)$ of the uniform scalar quantization dictionary for the azimuth $\theta$ depends on the coded elevation i; the azimuth step is set such that the distance between successive codewords is identical. The size of the azimuth dictionaries is symmetrical with respect to the equator (layers with negative elevations have the same number of points as positive ones).

The number $N_\theta(i)$ of coded azimuth values is given by:

$$N_\theta(0) = 422$$

$$N_\theta(i) = \frac{\pi}{\sin^{-1}\frac{r}{2R(i)}},\ i = 1, \ldots, N_\phi - 2$$

$$\text{Where } r = 2\sin\frac{\pi}{N_\theta(0)} \approx 0.014888927181374$$

$$N_\theta(N_\phi - 1) = 1$$

with $$R(1) \approx 0.999916868023083$$

$$R(i) = \cos(i\,\delta_\phi),\ i = 2, \ldots, N_\phi - 2$$

In practice, this gives:

$N_\theta(i = 0, \ldots, 121) =$

[422 421 421 421 421 421 420 420 419 419 418 417 416 416 415 414 413 411 410 409 408 406 405 403 401 400 398 396 394 392 390 388 386 384 382 379 377 374 372 369 367 364 361 358 355 352 349 346 343 340 337 333 330 327 323 320 316 313 309 305 301 298 294 290 286 282 278 274 269 265 261 257 252 248 244 239 235 230 225 221 216 211 207 202 197 192 188 183 178 173 168 163 158 153 148 143 137 132 127 122 117 111 106 101 96 90 85 80 74 69 64 58 53 47 42 37 31 26 20 15 9 1]

It is possible to verify that the total number of points in the grid is:

$$N_{tot} = N_\theta(0) + 2\sum_{i=1}^{N_\phi-1} N_\theta(i) = 65328$$

Each coded elevation $\hat{\phi}_i$ defines a spherical zone (a spherical zone delimited by the elevation values $\hat{\phi}_i \pm \delta_\phi$) in which an azimuth dictionary is used. The azimuth dictionaries have an offset set to 0 for even values of i and $$\frac{\pi}{N_\theta(i)}$$

for odd values of i.

In other words, the coded azimuth value (in degrees) is, for $j=0, \ldots, N_\theta(i)-1$:

$$\hat{\theta}(i, j) = \begin{cases} 360j/N_\theta(i) - 180 & i \text{ even} \\ 360(j+0.5)/N_\theta(i) - 180 & i \text{ odd} \end{cases}$$

The document cited above gives one method for coding a given point $(\phi, \theta)$.

Given a point $(\phi, \theta)$ to be coded, the quantization (search for the nearest neighbor) on the grid is carried out according to the following steps:

The sign $sgn_\phi$ and the absolute value $|\phi|$ of the elevation $\phi$ are determined; in particular $sgn_\phi=1$ if $\phi \geq 0$, $-1$ otherwise. The absolute value $|\phi|$ is coded by uniform scalar quantization by selecting the two nearest neighbors. This coding with “2 survivors” may for example be carried out by a preliminary search for the nearest neighbor in the (positive) elevation dictionary, through an exhaustive search.

$$i_1 = \arg\min_{i=0,\ldots,N_\phi-1} \left||\phi| - \hat{\phi}(i)\right| = \arg\min_{i=0,\ldots,N_\phi-1} \left(|\phi| - \hat{\phi}(i)\right)^2$$

$i_1$ denotes the index of the nearest neighbor. The index $i_2$ of the second nearest value is then determined according to the value of $i_1$:

$$i_2 = 1 \text{ if } i_1 = 0$$

$$i_2 = N_\phi - 2 \text{ if } i_1 = N_\phi - 1$$

$$i_2 = \arg\min_{i=i_1-1, i_1+1} \left||\phi| - \hat{\phi}(i)\right| \text{ if } 0 < i_1 < N_\phi - 1$$

This thus gives two candidates $sgn_\phi \cdot \hat{\phi}(i_1)$, $sgn_\phi \cdot \hat{\phi}(i_2)$, where $\hat{\phi}(i_k)$ is the coded absolute elevation, k=1 or 2, to represent the elevation $\phi$. In terms of absolute value, these two candidates are simply $\hat{\phi}(i_1)$ and $\hat{\phi}(i_2)$.

The azimuth $\theta$ is coded by uniform scalar quantization (with an elevation-dependent offset) according to the dictionary $\{\hat{\theta}(i_k, j), j=0, \ldots, N_\theta(i_k)\}$ corresponding respectively to k=1 or 2. The index $j_k$ is obtained as follows:

$$j_k = \mathrm{mod}_{N_\theta(i_k)}\left\lfloor \frac{\theta - \Delta + 180/N_\theta(i_k)}{360/N_\theta(i_k)} \right\rfloor$$

where $\lfloor \cdot \rfloor$ is the rounding to the lower integer, $\Delta=0$ if $i_k$ is even, $180/N_\theta(i_k)$ if $i_k$ is odd, and $\mathrm{mod}_{N_\theta(i_k)}$ is the modulo operation such that $\mathrm{mod}_{N_\theta(i_k)}(i)=i$ if $i=0, \ldots, N_\theta(i_k)-1$ and $\mathrm{mod}_{N_\theta(i_k)}(N_\theta(i_k))=0$. The index $j_k$ therefore satisfies: $0 \leq j_k \leq N_\theta(i_k)-1$.

The best candidate is selected by minimizing the spherical distance between $(\phi, \theta)$ and $(sgn_\phi \cdot \hat{\phi}(i_k), \hat{\theta}(i_k, j_k))$ according to k=1 or 2, which may be written independently of the sign $sgn_\phi$ (since the sign of $sgn_\phi \cdot \hat{\phi}(i_k)$ is identical to that of $\phi$) as:

$$d(i_k, j_k) = -\left(\sin\phi \sin\hat{\phi}(i_k) + \cos\phi \cos\hat{\phi}(i_k) \cos\left(\theta - \hat{\theta}(i_k, j_k)\right)\right)$$

The closest pair $(sgn_\phi \cdot \hat{\phi}(i_k), \hat{\theta}(i_k, j_k))$ in the sense of this distance is selected as the quantized value to be indexed. This selected point is denoted $(sgn_\phi \cdot \hat{\phi}(id_\phi), \hat{\theta}(id_\phi, id_\theta))$, where:

$$k^* = \arg\max_{k=1,2} d(i_k, j_k)$$

and $id_\phi = i_{k^*}$ and $id_\theta = j_{k^*}$

The quantization index (on 16 bits), denoted index here, of the selected point $(sgn_\phi \cdot \hat{\phi}(id_\phi), \hat{\theta}(id_\phi, id_\theta))$ is obtained by enumerating the points on the grid starting from the equator (all points of elevation $(\hat{\phi}(0)=0)$, then considering the first layer above the equator (all points of elevation $+\hat{\phi}(1)=\delta_\phi$), then the first layer below the equator (all points of elevation $-\hat{\phi}(1)=-\delta_\phi$), etc.

This gives an index in the form index within the interval $0, \ldots, N_{tot}-1$ where:

$$\text{index} = \begin{cases} id_\theta & \text{if } id_\phi = 0 \\ cumN(2id_\phi - 2) + id_\theta & \text{if } id_\phi > 0 \text{ and } sgn_\phi > 0 \\ cumN(2id_\phi - 1) + id_\theta & \text{if } id_\phi > 0 \text{ and } sgn_\phi < 0 \end{cases}$$

The cumulative cardinality values cumN are computed on the fly each time the index index is determined:

$$\mathrm{cum}N(0) = N_\theta(0)$$

$$cumN(1) = cumN(0) + N_\theta(1) = N_\theta(0) + N_\theta(1)$$

$$cumN(2) = cumN(1) + N_\theta(1) = N_\theta(0) + 2N_\theta(1)$$

$$cumN(3) = cumN(2) + N_\theta(2) = N_\theta(0) + 2N_\theta(1) + N_\theta(2)$$

$$cumN(4) = cumN(3) + N_\theta(2) = N_\theta(0) + 2N_\theta(1) + 2N_\theta(2)$$

$$\ldots$$

$$cumN(2i-1) = cumN(2i-2) + N_\theta(i)$$

$$cum(2i) = cumN(2i-1) + N_\theta(i)$$

The decoding method in the document cited above is explained in the flowchart in FIG. 4. The decoding consists, starting from the index index (block 400), in retrieving the elevation information $id_\phi$, $sgn_\phi$ and azimuth information $id_\theta$ (block 413), thereby then making it possible to reconstruct the point $(sgn_\phi \cdot \hat{\phi}(id_\phi), \hat{\theta}(id_\phi, id_\theta))$.

The principle of the decoding is that of successively comparing the value index with the successive cumulative cardinality values cumN (or cardinality sums), which are computed recursively on the fly for $i=0, \ldots, N_\phi-1$, taking into account the fact that the cardinalities $N_\theta(i)$ are identical for elevations of the same absolute value (in the Northern and Southern hemispheres). The sign of the elevation $sgn_\phi$ is decoded by exploiting the predefined order in which the spherical layers are written: equator, first layer with a positive elevation (+), first layer with a negative elevation (−), . . . , up to the North pole (+) and South pole (−) . . . . The values of $id_\phi$, $sgn_\phi$, cumN(0) are initialized (block 401).

If index≥cumN(0) (block 402), the decoding of the information is carried out for the "elevation layers" outside the equator of index i>0. The search for the "elevation layer" is carried out in a loop, starting from i=1 up to $i=N_\phi-1$ (blocks 403, 404, 411). In iteration i, the cumulative cardinality is computed recursively (blocks 405, 408) and compared with the index (block 406, 409) in order to decode the indices (blocks 407, 410).

If index<cumN(0) (block 402), the decoding of the indices of the information is carried out for the layer corresponding to the equator (block 412).

It should be noted that, in the implementation in the source code attached to the contribution 3GPP Tdoc S4-191167, a test for verifying whether $i=N_\phi-1$ is implemented in order to explicitly decode $id_\phi=N_\phi-1$, $sgn_\phi=-1$, $id_\theta=0$. This part is not adopted because the sign $sgn_\phi=1$ should also be possible in a grid containing the North and South pole, and it is normally needless because the definition $cumN(N_\phi-1)$ should allow the points associated with the poles to be decoded. The specific management of the poles may be neglected; the important thing is the principle of carrying out iterative decoding by comparing the index with a cumulative cardinality (or sum of cardinalities) computed over time.

Once the indices $id_\phi$, $sgn_\phi$ and $id_\theta$ have been decoded, the reconstruction of the spherical coordinates $(sgn_\phi \cdot \hat\phi(id_\phi), \hat\theta(id_\phi, id_\theta))$, in 413, adopts the definition of the grid defined above with:

$$\hat\phi(i) = i\delta_\phi \text{ for } i = 0, \ldots, N_\phi - 2 \quad \hat\phi(i) = 90 \text{ for } i = N_\phi - 1.$$

$$\hat\theta(i, j) = \begin{cases} 360j/N_\theta(i) - 180 & i \text{ even} \\ 360(j+0.5)/N_\theta(i) - 180 & i \text{ odd} \end{cases}$$

This method as implemented in the contribution 3GPP Tdoc S4-191167 cited above requires preliminary storage of $N_\phi=122$ floating values $(\hat\phi(i))$ for scalar quantization of the (positive) elevation, $N_\phi$ integer values giving $N_\theta(i)$ values for each (positive) elevation layer, and an integer value giving $N_\phi$. The grid does not use all possible values of indices on 16 bits, since 208 indices (from 65328 to 65535) are unused.

The main drawback of this method is that its complexity is very high, of the order of 123 WMOPS for coding (for weighted millions of operations per second) and 12 WMOPS for decoding, assuming 24 sub-bands (therefore 24 DoA per frame) and a temporal resolution of 5 ms (therefore one frame every 5 ms). This cost is high in particular due to the scalar quantization of the elevation being implemented by searching in a stored dictionary and above all due to the cumulative cardinalities cumN(i) being computed on the fly.

There is therefore a need to improve the methods from the prior art for 3D dimension spherical data quantization, in particular in order to efficiently code DoA data, with if possible the least possible complexity and while avoiding having unused indices for a given total number of points (or equivalently a given bit budget).

SUMMARY

The invention aims to improve the prior art.

To this end, the invention targets a method for coding a spatial direction of a sound source, this direction being defined by spherical coordinates comprising an elevation coordinate and an azimuth coordinate, wherein a spherical quantization dictionary is defined on a 3D sphere by an elevation coding and an azimuth coding, and wherein:

- the elevation coding uses a scalar quantization, giving at least one coded elevation index on a number of elevation levels,
- the azimuth coding uses a scalar quantization, according to a number of points per level depending on the index of the coded elevation,
- the number of points per level is determined on the basis of two successive cumulative cardinality values,
- the cumulative cardinality value for a coded elevation index being representative of a number of points proportional to a total number of points and according to the area of a spherical zone comprising at least one zone delimited by the upper horizontal plane of the positive elevation level of the coded elevation index and a lower horizontal plane of the sphere.

The cumulative cardinality values used to define the spherical quantization dictionary, in particular to determine the number of quantization levels for the azimuth coordinate, are thus based on a direct estimate of the area of spherical zones, thus avoiding on-the-fly and recursive computing of the sum of cardinalities used in the method proposed in the prior art, which is highly resource-intensive.

The method proposed here is significantly less resource-intensive, and is for example of the order of 2 WMOPS for coding and 1 WMOPS for decoding.

Defining such a quantization dictionary also makes it possible to exploit all possible points (or codewords) of the dictionary so as to make the quantization more efficient and avoid having unused indices (or codewords) in the grid. The invention is applied in particular in order to implement a more efficient method for coding and decoding DoA information on 16 bits to define the MASA format at input of an IVAS coding.

In one embodiment, the elevation coding includes levels corresponding to the equator and to the poles of the 3D sphere, thereby making it possible to include all particular points (equators and poles) of the sphere in the quantization dictionary.

In one embodiment, a number of points for the azimuth coding is predetermined for the elevation level corresponding to the equator, and the total number of points is obtained by subtracting, from a target number of points, the predetermined number of points corresponding to the equator and each of the North and South poles of the sphere, according to the following expression: $N_{tot}'=N_{tot}-N_\theta(0)-2N_\theta(N_\phi-1)$,

- $N_{tot}$ being the target number of points of the sphere for a given bit budget,
- $N_\theta(0)$, the predetermined number of points for the elevation level corresponding to the equator; and
- $2N_\theta(N_\phi-1)$ the predetermined number of points for the North and South poles of the sphere.

The method is thus adapted to the knowledge of the number of points for certain particular spherical layers, such as the one corresponding to the equator and those corresponding to the poles, which may be defined at a fixed value.

In one particular embodiment, the cumulative cardinality value for a coded elevation index is representative of a number of points proportional to the total number of points according to the area ($A_i$) of a spherical zone delimited by the upper horizontal plane of the positive elevation level of the coded elevation index and this same plane of the sphere symmetrical with respect to the equator minus the area ($A_0$) corresponding to the elevation level of the equator, according to the following ratio:

$$\frac{(A_i - A_0)}{(A_{N_\phi-2} - A_0)} N'_{tot},$$

$N_\phi-2$ being the number of elevation quantization levels without the equator and the North and South poles of the sphere and $A_{N_\phi-2}$, the area of the spherical zone corresponding to an elevation index $N_\phi-2$.

In one variant embodiment, the cumulative cardinality value for a coded elevation index is representative of a number of points proportional to the total number of points according to the area ($A'_i$) of a spherical zone delimited by the upper horizontal plane of the positive elevation level of the coded elevation index and that of the equator minus half the area corresponding to the elevation level of the equator, according to the following ratio:

$$\frac{(A'_i - A_0/2)}{(A'_{N_\phi-2} - A_0/2)} N'_{tot},$$

$N_\phi-2$ being the number of elevation quantization levels without the equator and the North and South poles of the sphere and $A'_{N_\phi-2}$, the area of the spherical zone corresponding to an elevation index $N_\phi-2$.

These ratios of areas of spherical zones make it possible to estimate, easily and directly through a simple rule of three, the number of points in the corresponding spherical zones that are subsets of the complete surface of the 3D sphere.

These ratios make it possible to express cumulative cardinality values as follows:

$$cumN(i) = 2Arr_i\left(\frac{N'_{tot}}{2}\frac{\sin\left(\left(i+\frac{1}{2}\right)\delta_\phi\right)-\sin\left(\frac{\delta_\phi}{2}\right)}{\sin\left(\left(N_\phi-\frac{1}{2}\right)\delta_\phi\right)-\sin\left(\frac{\delta_\phi}{2}\right)}\right)$$

with

- $i=1, \ldots, N_\phi-2$, $N_\phi-2$ being the number of elevation quantization levels without the equator and the North and South poles of the sphere,
- $Arr_i(\,)$ being a rounding to the nearest integer depending on i, $$2Arr_i\left(\frac{x}{2}\right)$$

corresponding to a rounding to an even integer and $\delta_\phi$ being a given quantization step of the elevation.

In one embodiment, the elevation coding gives a coded elevation index (i) on a number of elevation levels ($N_\phi$) and sign information.

Thus, only one hemisphere is considered to define the quantization dictionary, the number of elevation levels and the number of points per level being symmetrical about the equator.

In one embodiment, a global quantization index to be transmitted (index) is determined based on an azimuth index coded by scalar quantization on the determined number of points per level ($N_\theta(i)$) and a cumulative cardinality value obtained based on at least the coded elevation index.

The cardinality values thus defined may be estimated directly (analytically) in order to define the global index to be transmitted, thereby making it possible to reduce the maximum computational complexity.

The invention also relates to a method for decoding a spatial direction of a sound source, this direction being defined by spherical coordinates comprising an elevation coordinate and an azimuth coordinate, wherein a spherical quantization dictionary is defined on a 3D sphere by an elevation coding and an azimuth coding, and wherein:

- the elevation decoding uses a scalar quantization, giving at least one decoded elevation index (i) on a number of elevation levels ($N_\phi$),
- the azimuth decoding uses a scalar quantization, according to a number of points per level ($N_\phi(i)$) depending on the decoded elevation index (i),
- the number of points per level ($N_\theta(i)$) is determined on the basis of two successive cumulative cardinality values (cumN(i), cumN(i−1)),
- the cumulative cardinality value (cumN(i)) for a decoded elevation index (i) being representative of a number of points proportional to a total number of points and according to the area of a spherical zone comprising at least one zone delimited by the upper horizontal plane $$\left(\phi = \left(i+\frac{1}{2}\right)\delta_\phi\right)$$

of the positive elevation level of the decoded elevation index (i) and a lower horizontal plane of the sphere.

The decoding method has the same advantages as the coding method, and makes it possible to optimize computing resources by using an optimized spherical quantization dictionary.

In the same way as for the coding and according to the same advantages, in one embodiment, the elevation decoding includes levels corresponding to the equator (0°) and to the poles (+/−90°) of the 3D sphere.

According to one particular embodiment, a number of points ($N_\theta(0)$) for the azimuth decoding is predetermined for the elevation level corresponding to the equator, and the total number of points ($N_{tot}'$) is obtained by subtracting, from a target number of points ($N_{tot}=2^{16}$), the predetermined number of points corresponding to the equator and each of the North and South poles of the sphere, according to the following expression: $N_{tot}'=N_{tot}-N_\theta(0)-2N_\theta(N_\phi-1)$,

- $N_{tot}$ being the target number of points of the sphere for a given bit budget,
- $N_\theta(0)$, the predetermined number of points for the elevation level corresponding to the equator; and
- $2N_\theta(N_\phi-1)$ the predetermined number of points for the North and South poles of the sphere.

In one embodiment, the cumulative cardinality value (cumN(i)) for a decoded elevation index (i) is representative of a number of points proportional to the total number of points according to the area ($A_i$) of a spherical zone delimited by the upper horizontal plane $$\left(\phi = \left(i+\frac{1}{2}\right)\delta_\phi\right)$$

of the positive elevation level of the decoded elevation index (i) and this same plane of the sphere symmetrical with respect to the equator $$\left(\phi = -\left(i + \frac{1}{2}\right)\delta_\phi\right)$$

minus the area ($A_0$) corresponding to the elevation level of the equator, according to the following ratio:

$$\frac{(A_i - A_0)}{(A_{N_\phi-2} - A_0)} N'_{tot}$$

$N_\phi-2$ being the number of elevation quantization levels without the equator and the North and South poles of the sphere and $A_{N_\phi-2}$, the area of the spherical zone corresponding to an elevation index $N_\phi-2$.

In one possible example, the expression for the cumulative cardinality value is as follows:

$$cumN(i) = 2Arr_i\left(\frac{N'_{tot}}{2}\frac{\sin\left(\left(i+\frac{1}{2}\right)\delta_\phi\right) - \sin\left(\frac{\delta_\phi}{2}\right)}{\sin\left(\left(N_\phi - \frac{1}{2}\right)\delta_\phi\right) - \sin\left(\frac{\delta_\phi}{2}\right)}\right)$$

with

- i=1, . . . , $N_\phi-2$, $N_\phi-2$ being the number of elevation quantization levels without the equator and the North and South poles of the sphere,
- $Arr_i(\ )$ being a rounding to the nearest integer depending on i, $$2Arr_i\left(\frac{x}{2}\right)$$

corresponding to a rounding to an even integer and $\delta_\phi$ being a given quantization step of the elevation.

According to one embodiment, the elevation decoding gives a decoded elevation index (i) on a number of elevation levels ($N_\phi$) and sign information.

In one embodiment, the decoding comprises receiving a global quantization index (index) and determining, based on this index, a cumulative cardinality value obtained on the basis of at least the decoded elevation index and a decoded azimuth index on a determined number of points per level ($N_\theta(i)$).

The invention targets a coding device comprising a processing circuit for implementing the steps of the coding method as described above.

The invention also targets a decoding device comprising a processing circuit for implementing the steps of the decoding method as described above.

The invention relates to a computer program comprising instructions for implementing the coding or decoding methods as described above when they are executed by a processor. Finally, the invention relates to a storage medium able to be read by a processor and storing a computer program comprising instructions for executing the coding method or the decoding method described above.

BRIEF DESCRIPTION OF THE DRAWINGS

Other features and advantages of the invention will become more clearly apparent on reading the following description of particular embodiments, which are given by way of mere illustrative and non-limiting examples, and the appended drawings, in which.

DETAILED DESCRIPTION OF ILLUSTRATIVE EMBODIMENTS

The invention described below relates to the quantization of spherical data in dimension 3. This is applicable, by way of example, to the coding and decoding of spatial directions of sound sources (DoA), for coding and decoding for example of MASA data as described later with reference to FIGS. 5 to 7. In some variants, the invention may be applied to DiRAC coding or any type of coding/decoding of audio data or coding of any other type of data in which 3D direction information is coded.

Without loss of generality, the definition of 3D spherical coordinates in degrees in line with the geographical convention that is used in the description of the MASA format reference proposal will be adopted here.

The radius, which is set to 1 here, will be omitted, keeping only the azimuth and the elevation in the case of coding a direction of sources (or DoA), as in a DiRAC or MASA scheme. In some variants and for certain applications (for example quantization of a sub-band in transform-based coding), it will be possible to code a radius separately (corresponding to a mean amplitude level per sub-band for example).

In some variants, units other than degrees (for example radians) will be used, and conventions other than the geographical convention will be used; for example elevation may be replaced with colatitude. Thus, other equivalent spherical coordinate systems (obtained for example by permuting or inverting Cartesian coordinates) may be used according to the invention—it will be sufficient to apply the necessary conversions in the definition of the scalar quantization dictionaries, the reconstruction, etc. The coding and the decoding according to the invention is applicable to all definitions of spherical coordinates, and it is thus possible to replace $\phi$, $\theta$ with other spherical coordinates by adapting the conversion between Cartesian coordinates and spherical coordinates.

Figure 5A:
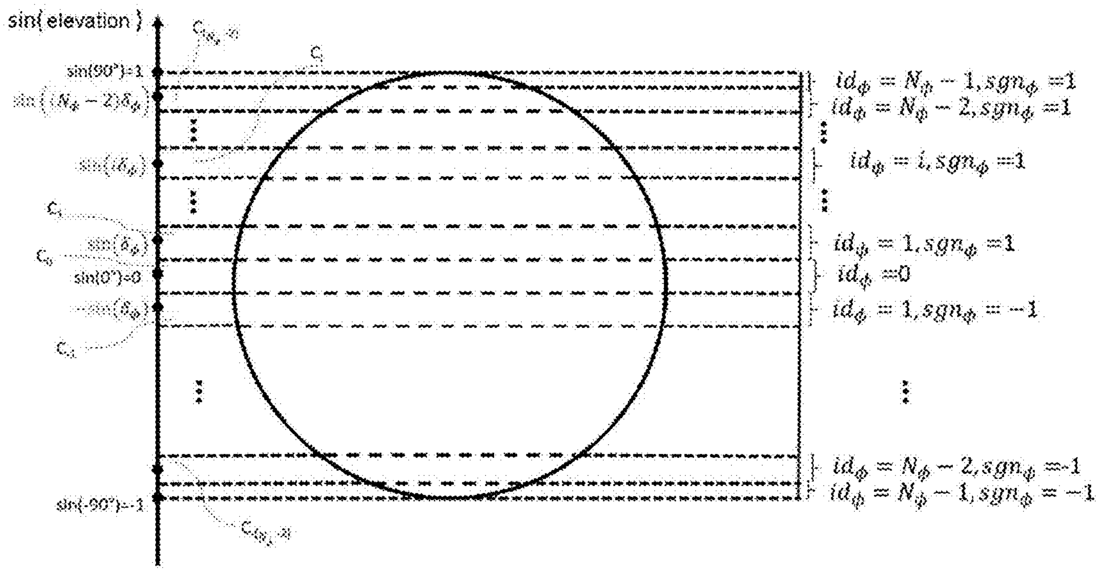
FIG. 5*a* illustrates spherical zones brought about by the discretization of the elevation to define the spherical quantization dictionary, according to one embodiment of the invention.

FIG. 5*a* illustrates a 2D partial representation of a spherical quantization dictionary (grid) according to one embodiment of the invention. According to the invention, the spherical quantization dictionary is defined by an elevation coding and an azimuth coding. The elevation coding uses a scalar quantization, with a discretization of the elevation that, according to one embodiment, includes levels corresponding to the equator (zero elevation) and to the poles (elevation +/−90°) of the 3D sphere. The elevation coding gives at least one coded elevation index (i) on a number of elevation levels.

This discretization uses a number of positive levels ($N_\phi$) for the Northern hemisphere and an elevation sign indication (indicating the Northern or Southern hemisphere), which is tantamount to $2N_\phi-1$ levels for coding elevation in both the Northern and Southern hemispheres of the 3D sphere.

As illustrated in FIG. 5*a*, it is therefore possible to see the spherical quantization dictionary, also hereinafter called a grid according to the invention, as a set of $2N_\phi-1$ "spherical layers" or "horizontal slices" shown as $C_0$, $C_1$, $C_{-1}$, . . . $C_i$, . . . , $C_{(N_{\phi-1})}$, $C_{-(N_{\phi-1})}$ brought about by the elevation quantization (the limits of each dotted slice are given by the elevation quantization decision thresholds, outside poles). The surface of the Northern hemisphere is divided into layers $C_0$ (only the upper half of $C_0$, above the equator, is in the Northern hemisphere), $C_1$, . . . $C_i$, . . . , $C_{(N_{\phi-1})}$, whereas the surface of the Southern hemisphere is divided into layers $C_0$ (only the lower half of $C_0$, below the equator, is in the Southern hemisphere), $C_{-1}$, . . . $C_{-i}$, . . . , $C_{-(N_{\phi-1})}$.

It should be noted that FIG. 5*a* shows a 2D projection of the 3D sphere, taking an arbitrary vertical cutting plane. The axis 0z in Cartesian coordinates is indicated, with a graduation according to the sine of the elevation, since the z coordinate corresponds to z=sin $\phi$ in the chosen convention.

The azimuth coding uses a scalar quantization, according to the number of azimuth levels ($N_\theta(i)$) (also called number of points per level) depending on the coded (positive or absolute) elevation index (i=0, . . . , $N_\phi-1$), this number of levels $N_\theta(i)$ being symmetrical about the equator for the Northern and Southern hemispheres.

The determination of this number of azimuth levels is described below.

In order not to overload this figure, the subdivision of these horizontal layers into equally distributed "regions" according to the discretization of the azimuth with a number $N_\theta(i)$ of azimuth levels depending on the elevation level is not shown.

The spherical grid according to the invention discretizes the elevation and the azimuth separately by scalar quantization, with a uniform discretization of the azimuth according to a number of levels $N_\theta(i)$) depending on the (positive or absolute) coded elevation value i. However, the optimum search for the nearest neighbor in the grid involves selecting two elevation candidates, and therefore also two associated azimuth candidates in order to select the best candidate; this is therefore tantamount to joint coding even though it is separate in practice, and the actual decision regions of the grid (in terms of Voronoi regions on the surface of the sphere) are therefore not spherical rectangles. For indexing purposes (coding of the global index and decoding), the discretization of the surface of the 3D sphere may nevertheless be seen as a separate elevation and azimuth division to obtain spherical rectangles (excluding caps at the poles).

The coordinates $\phi$ and $\theta$ are coded separately, with a scalar quantization dictionary $\{s\cdot\hat{\phi}(id_\phi), id_\phi=0, \ldots, N_\phi-1, s=+1 \text{ or } -1\}$ with $N_\phi$ levels for $|\phi|$ and with sign information s (indicating the Northern hemisphere for s=+1 or Southern hemisphere for s=−1) and a set of uniform scalar quantization dictionaries $\{\hat{\theta}(i,j), j=0, \ldots, N_\theta(i)-1\}$ with $N_\theta(i)$ levels for $\theta$ according to the coded (positive or absolute) elevation index i.

The total number of points of the sphere discretized according to the various determined numbers of levels, also called the total number of points in the 3D grid, is given, in one particular embodiment, by:

$$N_{tot} = N_\theta(0) + 2\sum_{i=1}^{N_\phi-1} N_\theta(i)$$

This number includes the points $N_\theta(0)$ on the elevation level (the spherical layer) corresponding to the equator (C0, $id_\phi=0$) and the points $N_\theta(i)$ of each positive elevation level of index i=1, . . . , $N_\phi-1$, also called elevation layer Ci, these being symmetrical between the Northern and Southern hemisphere and therefore counted in duplicate.

The spherical grid is therefore defined as the following spherical vector quantization dictionary (with a radius assumed to be equal to 1 by convention):

$$\{(s\cdot\hat{\phi}(i), \hat{\theta}(i,j)) \mid s=-1, 1 \text{ if } i>1, 1 \text{ if } i=0; i=0, \ldots, N_\phi-1; j=0, \ldots, N_\theta(i)-1\}$$

It should be noted that the value of s for i=0 is arbitrary, since $\hat{\phi}(i=0)=0$.

In the preferred embodiment, a 3D grid is defined for a given bit budget on 16 bits, for example, thus giving a total number of points of the sphere, that is to say $N_{tot}=2^{16}$. In some variants, other values of $N_{tot}$ (and therefore bit budget values) will be possible.

The elevation is coded by scalar quantization on $N_\phi$ reconstruction levels. In the preferred embodiment, $N_\phi=122$ is set as the number of positive levels, as in the grid in the MASA format described above. This makes it possible in particular to have an even number of levels in the Northern hemisphere ($N_\phi$ including the North pole and the equator). If also taking into account the Southern hemisphere, the elevation is therefore coded on $2N_\phi-1$ levels (counting the equator only once). The inclusion of the poles allows a complete representation of the sphere, and the impact is minimal since only 2 points of the grid are associated with the poles (when the sign is applied).

For the elevation coding by scalar quantization, a uniform quantization step $\delta_\phi$ (outside poles) is defined and the following is adopted:

$$\hat{\phi}(i) = i\delta_\phi \text{ for } i = 0, \ldots, N_\phi - 2 \text{ and } \hat{\phi}(i) = 90 \text{ for } i = N_\phi - 1$$

with for example $\delta_\phi$=0.7388 degrees, as in the grid in the MASA format described above. The quantization step is uniform over the interval $[-\hat{\phi}(N_\phi-2), \hat{\phi}(N_\phi-2)]$ or $[-(N_\phi-2)\delta_\phi, (N_\phi-2)\delta_\phi]$, if the sign is taken into account.

The azimuth θ is coded by scalar quantization on $N_\theta(i)$ levels. Use is preferably made of a uniform scalar quantization with a uniform scalar quantization dictionary, taking into account the cyclic nature of the interval [−180,180] degrees:

$$\hat{\theta}(i, j) = \begin{cases} 360\, j/N_\theta(i) - 180 & i \text{ even} \\ 360\,(i + 0.5)/N_\theta(i) - 180 & i \text{ odd} \end{cases}$$

The azimuth dictionaries have an offset, as it is known, set to 0 for even values of i and $$\frac{\pi}{N_\theta(i)}$$

for odd values of i, in order to "shift" the "horizontal slice" (spherical layer) of the sphere (delimited by the elevation decision thresholds) associated with each elevation of index i such that the coded azimuths are aligned as little as possible from one successive layer to another.

In some variants, a uniform scalar quantization over the interval [0,90] degrees (including the values 0 and 90 as reconstruction levels) may be used for the elevation coding:

$$\hat{\phi}(i) = \frac{i}{N_\phi - 1}90,\ i = 0, \ldots, N_\phi - 1$$

This is tantamount to changing the quantization step $\delta_\phi$ in order to have $\delta_\phi=90/(N_\phi-1)$, that is to say $\delta_\phi \approx 0.7438$ when $N_\phi=122$; in this case, the poles are naturally included as codewords. The quantization step is uniform over the interval $[-\hat{\phi}(N_\phi-1), \hat{\phi}(N_\phi-1)]$, that is to say [−90,90] degrees, if the sign is taken into account.

In other variants, it is possible to change the number of levels $N_\phi$ or to take other definitions from the scalar quantization dictionary $\{\hat{\phi}(i), i=0, \ldots, N_\phi-1\}$ for the (positive or absolute) elevation. It will however be assumed that $\hat{\phi}(i=0)=0°$ and $\hat{\phi}(i=N_\phi-1)=90°$.

In other variants, the offset applied to the azimuth depending on the elevation layer may be different, the important aspect being that the number of azimuth levels is defined according to the invention.

According to the invention, the number of points per level ($N_\theta(i)$) is determined on the basis of two successive cumulative cardinality values (cumN(i), cumN(i−1)), the cumulative cardinality value (cumN(i)) for a coded elevation index (i) being representative of a number of points proportional to a total number of points, and according to the area of a spherical zone comprising at least one zone delimited by the upper horizontal plane $$\left(\phi = \left(i + \frac{1}{2}\right)\delta_\phi\right)$$

of the given positive elevation level (i) and a lower horizontal plane (for example $\phi=\delta_\phi/2$). In the preferred embodiment, this spherical zone also comprises the symmetrical part in the Southern hemisphere comprising a zone delimited by the upper horizontal plane $$\left(\phi = -\left(i + \frac{1}{2}\right)\delta_\phi\right)$$

of the given elevation level (i) and a lower horizontal plane ($\phi=-\delta_\phi/2$). The notation cumN(i) is adopted here, but it should not be confused with that used previously in the description of the prior art.

Figure 5B:
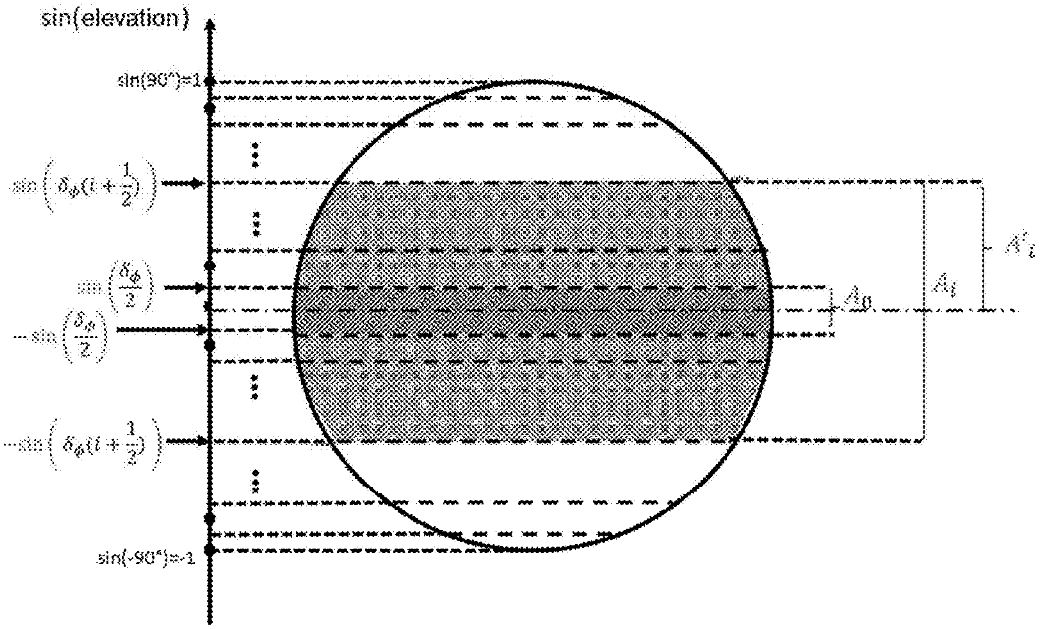
FIG. 5*b* illustrates the areas used for determining the number of points in azimuth to define the spherical quantization dictionary, according to one embodiment of the invention.

FIG. 5*b* illustrates these spherical zones for which the surface area of the 3D sphere is taken into account in a first and a second embodiment.

In one particular embodiment, the number of azimuth levels $N_\theta(i)$ is determined by predefined values for $N_\theta(0)$ and $N_\theta(N_\phi-1)$, which correspond to the equator and to one of the poles, respectively.

These predetermined numbers of points ($N_\theta(0)$ and $N_\theta(N_\phi-1)$) are taken into account when determining the cumulative cardinality values and to define the total number $N_{tot}'$ of points used for this determination.

In this embodiment, the total number of points ($N_{tot}'$) is obtained by subtracting, from a target number of points ($N_{tot}=2^{16}$), the predetermined number of points corresponding to the equator and each of the North and South poles of the sphere according to the following expression: $N_{tot}'=N_{tot}-N_\theta(0)-2N_\theta(N_\phi-1)$, $N_{tot}$ being the target number of points of the sphere for a given bit budget, $N_\theta(0)$, the predetermined number of points for the elevation level corresponding to the equator and $2N_\theta(N_\phi-1)$ the predetermined number of points for the North and South poles of the sphere.

In the main embodiment, $N_\theta(0)$ is an even value, $N_\theta(N_\phi-1)=1$ and therefore when $N_{tot}$ is even, $N_{tot}'$ is also even.

In one example illustrated in FIG. 5*b*, the area of a spherical zone delimited by the upper horizontal plane $$\left(\phi = \left(i + \frac{1}{2}\right)\delta_\phi\right)$$

of the given positive elevation level (i) and this same plane of the sphere symmetrical with respect to the equator $$\left(\phi = -\left(i + \frac{1}{2}\right)\delta_\phi\right)$$

is illustrated by the hatched zone $A_i$. The area corresponding to the elevation level of the equator, shown at $A_0$, is subtracted from this area in order to determine the cumulative cardinality value (cumN(i)) of the given positive elevation level (i).

For this purpose, a number of points is estimated based on the ratio $(A_i-A_0)/(A_{N_\phi-2}-A_0)$. This number of points is proportional to the total number of points $N_{tot}'$ expressed above, according to the following ratio:

$$\frac{(A_i - A_0)}{(A_{N_\phi-2} - A_0)} N'_{tot}$$

By design, this ratio gives exactly $N_{tot}'$ when $i=N_\phi-2$, thereby guaranteeing that the total number of points is used in full.

Since this ratio is generally a fractional number, it will have to be rounded to obtain the cumulative cardinality, and since the number of points is determined in the main embodiment for both the Northern and Southern hemispheres (thus in duplicate), the rounding will in this case be carried out to an even integer (the nearest lower or higher one).

It will be recalled that the surface area of an element around the point $(\theta, \phi)$ on the sphere $\delta_2$ is given by $dA=r^2 \cos\phi d\theta d\phi$, where $\phi$ here is the elevation (if colatitude were to be used, this would give a term in $\sin\phi$). The partial surface area defined by a spherical zone delimited by two horizontal planes brought about by an elevation interval $[\phi_{min}, \phi_{max}]$, where $-90°\le\phi_{min}<\phi_{max}\le 90°$, the azimuth being over $[-180°, 180°]$, is given by:

$$A(\phi_{min}, \phi_{max}) = r^2 \int_{-180°}^{180°} d\theta \int_{\phi_{min}}^{\phi_{max}} \cos\phi \, d\phi = 2\pi r^2(\sin\phi_{max} - \sin\phi_{min})$$

In particular, this gives the known result that the surface area of the sphere $\mathbb{S}_2$ of radius r is $A_{tot}=A(-90°, 90°)=4\pi r^2$ (for $\phi_{min}=-90°$ and $\phi_{max}=$) 90°.

For a remaining number of points $N_{tot}'$ in the spherical grid (or spherical vector quantization dictionary) to be distributed in a spherical zone (subset of the surface of the 3D sphere) delimited by the horizontal planes $$\phi = -\left(N_\phi - 2 + \frac{1}{2}\right)\delta_\phi$$

outside the central zone corresponding to the equator $$\left(\phi = \pm\frac{\delta_\phi}{2}\right),$$

each decision region associated with a point of the grid is approximated here by a "spherical rectangle" for indexing purposes (this corresponding to a separate coding decision in relation to the spherical coordinates). Each of these regions should ideally have a surface area of $4\pi r^2/N_{tot}'$ if the grid is uniform.

For a uniform discretization of the elevation over the interval $[-(N_\phi-2)\delta_\phi, (N_\phi-2)\delta_\phi]$, as in the main embodiment, it is therefore possible to estimate the number of points on the grid contained within a spherical zone (or "spherical slice") delimited by two horizontal planes associated with the decision thresholds $$\phi_{min} = \frac{\delta_\phi}{2} \text{ and } \phi_{max} = \left(i + \frac{1}{2}\right)\delta_\phi$$

of the positive part (Northern hemisphere) of the sphere.

According to the ratio expressed above, expressing a simple rule of three $$\frac{(A_i - A_0)}{(A_{N_\phi-2} - A_0)} N_{tot}',$$

it is possible to express $$\frac{(A_i - A_0)}{2} = A(\phi_{min}, \phi_{max}) \text{ with } \phi_{min} = \frac{\delta_\phi}{2} \text{ and } \phi_{max} = \left(i + \frac{1}{2}\right)\delta_\phi,$$

and with $$A\left(\frac{\delta_\phi}{2}, \left(i + \frac{1}{2}\right)\delta_\phi\right) = 2\pi r^2\left(\sin\left(i + \frac{1}{2}\right)\delta_\phi - \sin\frac{\delta_\phi}{2}\right)$$

In one exemplary embodiment, the following is set:

$$N_\theta(0) = 430$$

In some variants, the value of $N_\theta(0)$ may be different but even.

Moreover, by convention $N_\theta(N_\phi-1)=1$ is set, since a single point is sufficient to represent a pole.

The number of points per elevation level i is expressed by:

$$N_\theta(i) = \frac{(cumN(i) - cumN(i-1))}{2}$$

where $$cumN(0) = 0$$

$$cumN(i) = 2Arr_i\left(\frac{N_{tot}'}{2}\frac{\sin\left(\left(i + \frac{1}{2}\right)\delta_\phi\right) - \sin\left(\frac{\delta_\phi}{2}\right)}{\sin\left(\left(N_\phi - \frac{1}{2}\right)\delta_\phi\right) - \sin\left(\frac{\delta_\phi}{2}\right)}\right)$$

$$\text{for } i = 1, \ldots, N_\phi - 2$$

$$\text{with } N_{tot}' = N_{tot} - N_\theta(0) - 2N_\theta(N_\phi - 1)$$

and $Arr_i(\ )$ is a rounding to the (nearest lower or higher) integer depending on i. In the preferred embodiment, $Arr_1(\ )$ is taken as the rounding to the upper integer, and $Arr_i(\ )$ is taken as the rounding to the closest integer for $i=2, \ldots, N_\phi-2$.

It should be noted that the function $2Arr_i(x/2)$ corresponds in fact to a rounding to a (nearest lower or higher) even integer, thereby making it possible to divide the result by two in order to assign the integer half to each of the hemispheres.

It should be noted that, by definition, $$cumN(N_\phi - 2) = 2Arr_i\left(\frac{N_{tot}'}{2}\right) = N_{tot}'.$$

Moreover, it should be noted that the notation cumN(i) is adopted here even though it is different from the one used previously in the description of a MASA format proposed in the prior art. Indeed, here cumN(i) corresponds to the cumulative cardinality of the spherical grid up to and including elevation layer i (with the layers in the Northern and Southern hemispheres), but not counting the equator. The definition of cumN(i) for i=1, . . . , $N_\phi-2$ in the description of the invention therefore corresponds to the equivalent of cumN(2i)−$N_\theta(0)$ in the definition from the prior art.

In variants where other quantization levels are defined for the elevation, the definition of cumN(i) according to sin $$\left(\left(i+\frac{1}{2}\right)\delta_\phi\right),$$

i=0, . . . , $N_\phi-2$, will be adapted by replacing $$\left(i+\frac{1}{2}\right)\delta_\phi$$

with other corresponding decision thresholds in the form $$\frac{\hat{\phi}(i)+\hat{\phi}(i+1)}{2}.$$

Thus, more generally, it will be possible to write:

$$cumN(i) = 2Arr_i\left(\frac{N'_{tot}}{2}\frac{\sin\left(\frac{\hat{\phi}(i)+\hat{\phi}(i+1)}{2}\right)-\sin\left(\frac{\hat{\phi}(0)+\hat{\phi}(1)}{2}\right)}{\sin\left(\frac{\hat{\phi}(N_\phi-2)+\hat{\phi}(N_\phi-1)}{2}\right)-\sin\left(\frac{\hat{\phi}(0)+\hat{\phi}(1)}{2}\right)}\right)$$

$$\text{for } i = 1, \ldots, N_\phi - 2.$$

One example of values obtained for the preferred embodiment is given below:

$N_\theta(i = 0, \ldots, 121) =$

[430 423 422 422 422 422 421 421 420 420 419 418 417 417 416
414 414 412 412 409 409 407 406 404 402 401 399 397 395 394
391 389 387 385 383 380 378 375 373 370 368 365 362 359 356
354 350 347 344 341 338 334 331 328 324 321 317 313 310 306
302 299 294 291 287 282 279 274 270 266 262 258 253 249 244
240 235 231 226 222 217 212 208 202 198 194 188 183 179 173
169 163 159 153 148 144 138 133 127 123 117 112 107 102 96
91 85 81 75 69 64 59 53 48 43 37 32 26 21 15 10 1]

It may easily be verified that:

$$N_\theta(0) + 2\sum_{i=1}^{N_\phi-1} N_\theta(i) = 65536,$$

this indeed corresponding to $N_{tot}$.

The cardinality $N_\theta(i)$ according to the invention thus makes it possible to guarantee that there is no unused index for a given total number $N_{tot}$. This property stems from the fact that the cumulative cardinality cumN(i) is defined such that cumN $$(N_\phi - 2) = N'_{tot}.$$

In another exemplary embodiment, predetermined numbers are not set for the elevation levels corresponding to the equator.

In this case, the cumulative cardinality value is a rounded value of the following ratio:

$$\frac{A_i}{A_{N_\phi-2}}(N_{tot}-2)$$

with for example $N_{tot}=2^{16}$.

This then gives (outside the poles)

$$cumN(i) = 2Arr_i\left(\frac{N_{tot}-2}{2}\frac{\sin\left(\left(i+\frac{1}{2}\right)\delta_\phi\right)}{\sin\left(\left(N_\phi-\frac{3}{2}\right)\delta_\phi\right)}\right)$$

for i=0, . . . , $N_\phi-2$. In this case: $N_\theta(0)$=cumN(0) and $$N_\theta(i) = \frac{(cumN(i) - cumN(i-1))}{2}$$

for i=1, . . . , $N_\phi-2$. $N_\theta(N_\phi-1)=1$ is also set.

One example is given below of values obtained for this variant definition of cumN(i) in the case where $N_\phi=122$ and $\delta_\phi$ is defined according to the preferred embodiment:

$N_\theta(i = 0, \ldots, 121) =$

[422 423 422 423 422 421 422 420 421 419 419 419 417 417 416
414 414 412 412 410 408 407 406 404 403 400 400 397 395 393
392 389 387 385 383 380 378 375 373 370 368 365 362 359 356
354 350 348 344 341 337 335 331 328 324 321 317 313 310 306
302 299 294 291 287 282 279 274 271 266 261 258 253 249 244
240 236 230 227 221 217 213 207 203 198 193 188 184 178 174
168 164 158 154 148 144 138 133 127 123 117 112 107 102 96
91 85 81 75 69 64 59 53 48 43 37 32 26 21 15 10 1]

It may in this case too easily be verified that:

$$N_\theta(0) + 2\sum_{i=1}^{N_\phi-1} N_\theta(i) = 65536,$$

this indeed corresponding to $N_{tot}$.

In variants where other quantization levels are defined for the elevation, the definition of cumN(i) according to sin $$\left(\left(i+\frac{1}{2}\right)\delta_\phi\right),$$

$i=0, \ldots, N_\phi-2$, will be adapted by replacing $$\left(i+\frac{1}{2}\right)\delta_\phi$$

with other corresponding decision thresholds in the form $$\frac{\hat{\phi}(i)+\hat{\phi}(i+1)}{2}.$$

In other variants, predetermined numbers are not set for the elevation levels corresponding to the equator ($N_\theta(0)$) or to the North and South poles ($N_\theta(N_\phi-1)$). This variant applies in particular to the case where the scalar quantization of $\phi$ is uniform over the interval [0,90] degrees (including the values 0 and 90 as reconstruction levels) with:

$$\hat{\phi}(i)=\frac{i}{N_\phi-1}90,\ i=0,\ \ldots\ ,N_\phi-1$$

$$\text{with } \delta_\phi=90/N_\phi-1.$$

In this case, it is possible to define:

$$cumN(i)=2Arr_i\left(\frac{N_{tot}}{2}\sin\left(\left(i+\frac{1}{2}\right)\delta_\phi\right)\right)$$

$$\text{for } i=0,\ \ldots\ ,N_\phi-2, \text{ and}$$

$$cumN(N_\phi-1)=N_{tot}$$

this gives:

$$N_\theta(0)=cumN(0)$$

and $$N_\theta(i)=\frac{(cumN(i)-cumN(i-1))}{2}$$

$$\text{for } i=1,\ \ldots\ ,N_\phi-1.$$

One example is given below of values obtained for this variant definition of cumN(i) in the case where $N_\phi=122$ and $\delta_\phi$ is defined according to the preferred embodiment:

$N_\theta(i=0,\ \ldots,\ 121)=$

[426 425 425 425 425 425 424 423 423 423 422 421 420 419 419
417 416 415 414 413 411 410 408 406 405 403 402 399 398 395
394 391 390 387 384 382 380 377 375 372 369 367 364 360 358
355 352 349 345 342 339 336 332 328 325 322 318 314 310 307
302 299 295 291 287 283 278 275 270 266 261 257 253 248 244
239 235 230 225 221 215 212 206 201 197 191 187 182 177 171

-continued 167 161 157 151 146 141 136 130 125 120 114 110 104 98 93
88 82 77 72 66 60 55 50 44 38 34 27 22 17 11 5 1]

It may in this case too easily be verified that:

$$N_\theta(0)+2\sum_{i=1}^{N_\phi-1}N_\theta(i)=65536,$$

this indeed corresponding to $N_{tot}$.

In a second example illustrated in FIG. 5*b*, the area of a spherical zone delimited by the upper horizontal plane $$\left(\phi=\left(i+\frac{1}{2}\right)\delta_\phi\right)$$

of the given positive elevation level (i) and that of the equator is illustrated by the zone denoted A'i. Half of the area corresponding to the elevation level of the equator, shown at A0, is subtracted from this area in order to determine the cumulative cardinality value (cumN(i)) of the given positive elevation level (i).

For this purpose, a number of points is estimated based on the ratio $(A'_i-A_0/2)/(A'_{N_\phi-2}-A_0/2)$. This number of points is proportional to the total number of points $N_{tot}'$ expressed above, according to the following ratio:

$$\frac{A'_i-A_0/2}{A'_{N_\phi-2}-A_0/2}N'_{tot},$$

with $A'_{N_\phi-2}$ the area of the spherical zone delimited by the upper horizontal plane $$\left(\phi=(N_\phi-\frac{1}{2})\delta_\phi\right)$$

of the positive elevation level $N_\phi-2$ and that of the equator.

The result is equivalent to what was described above, since $$\frac{A'_i-A_0/2}{A'_{N_\phi-2}-A_0/2}=\frac{2A'_i-A_0}{2A'_{N_\phi-2}-A_0}=\frac{A_i-A_0}{A_{N_\phi-2}-A_0}$$

In one variant embodiment, the cumulative cardinality value may be expressed taking into account only the number of points of the positive part of the sphere.

In this scenario, a number of points is estimated based on the ratio $(A'_i-A_0/2)/(A'_{N_\phi-2}-A_0/2)$. This number of points is proportional to the total number of points $N_{tot}'$ expressed above, according to the following ratio:

$$\frac{(A'_i-A_0/2)}{(A'_{N_\phi-2}-A_0/2)}\frac{N'_{tot}}{2}$$

The expression of the cumulative cardinality value is given for example by:

$$cumN'(i) = Arr_i\left(\frac{N'_{tot}}{2}\frac{\sin\left((i+\frac{1}{2})\delta_\phi\right)-\sin\left(\frac{\delta_\phi}{2}\right)}{\sin\left((N_\phi-\frac{1}{2})\delta_\phi\right)-\sin\left(\frac{\delta_\phi}{2}\right)}\right)$$

$$\text{for } i = 1, \ldots, N_\phi - 2$$

$$\text{with } N'_{tot} = N_{tot} - N_\theta(0) - 2N_\theta(N_\phi - 1)$$

And $Arr_i(\,)$ is a rounding to the nearest integer depending on i. In the preferred embodiment, $Arr_1(\,)$ is taken as the rounding to the upper integer, and $Arr_i(\,)$ is taken as the rounding to the closest integer for i=2, . . . , $N_\phi-2$.

And the number of points per elevation level i is expressed by:

$$N_\theta(i) = (cumN'(i) - cumN'(i-1))$$

Figure 1:
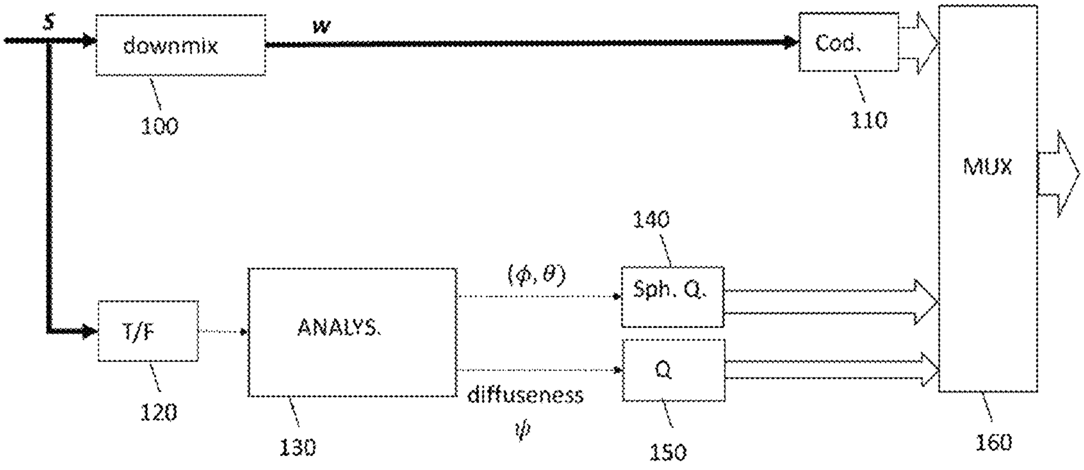
FIG.1 (prior art)
FIG. 1, described above, illustrates a DiRAC coding device with coding of spherical data in dimension 3.
Figure 3:
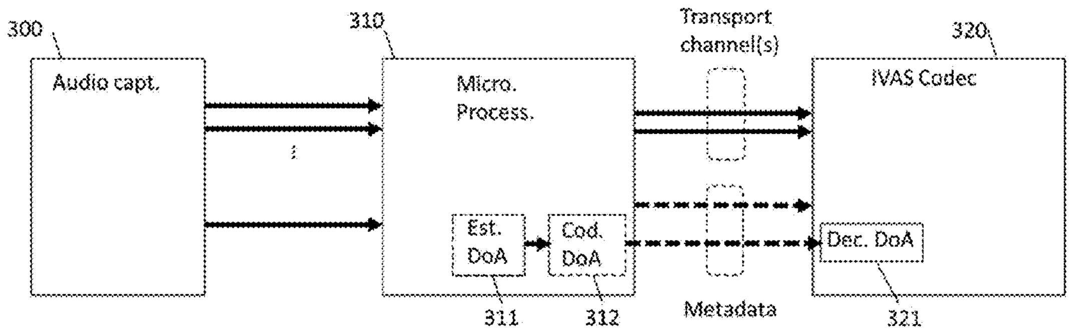
FIG.3 (prior art)
FIG. 3, described above, illustrates a smartphone device equipped with multiple microphones with a MASA spatial pre-analysis in order to provide a MASA format as input for a coding.
Figure 4:
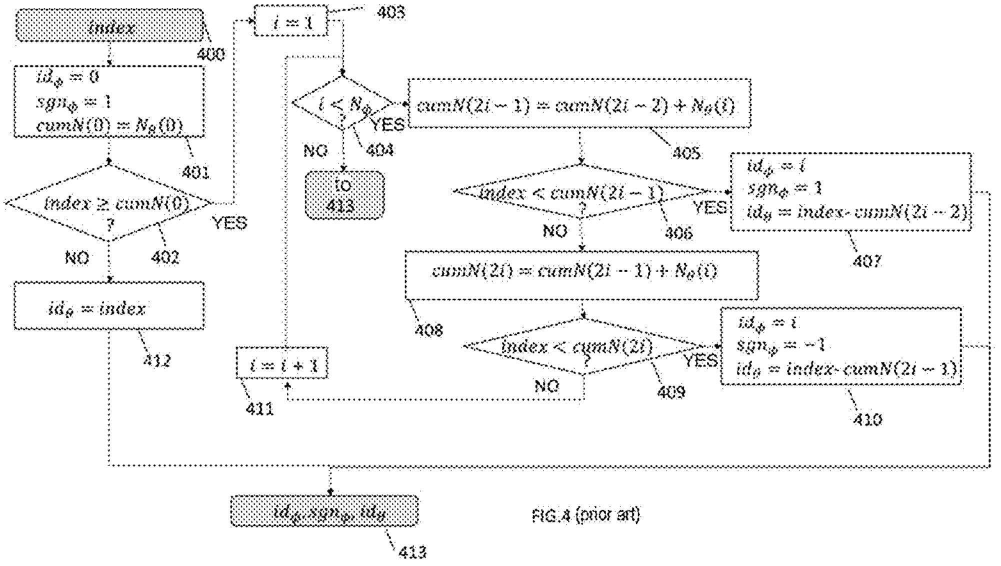
FIG.4 (prior art)
FIG. 4, described above, illustrates the steps implemented in the decoding of spherical data in dimension 3, in the form of a flowchart.
Figure 6A:
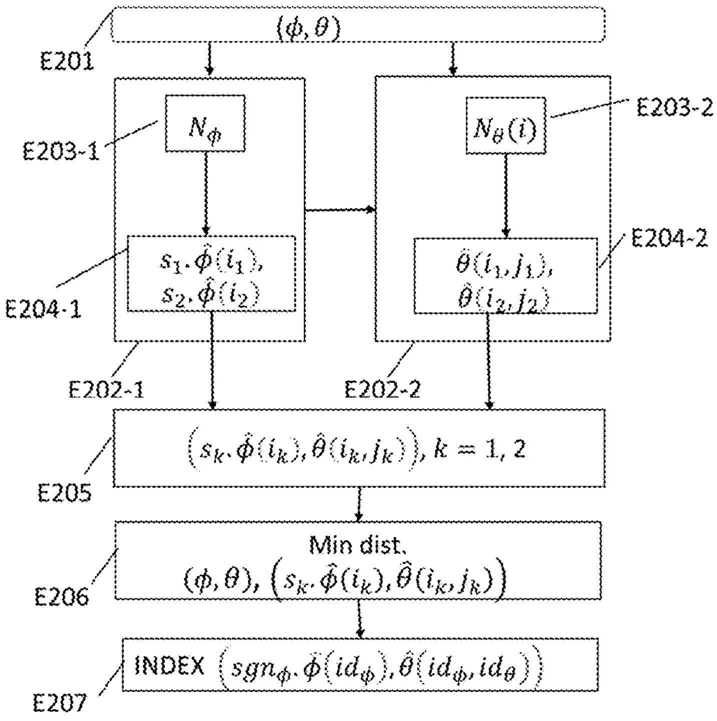
FIG. 6*a* illustrates the steps implemented in a coding method according to one embodiment of the invention, in the form of flowcharts.

FIG. 6*a* describes a method for coding spherical coordinates (φ, θ) of an input point (E201) on a 3D sphere. This coding method may be implemented, in one embodiment, by block 312 from FIG. 3 for the MASA data format or in block 140 from FIG. 1 for a DiRAC coder.

The quantization of the spherical coordinates and the search is carried out as follows:

The elevation φ is first of all coded in E202-1. For the search to be optimum, it is necessary to select the 2 values $sgn_\phi\cdot\hat{\phi}(i_1)$, $sgn_\phi\cdot\hat{\phi}(i_2)$ where $sgn_\phi$ is the sign of φ and $\hat{\phi}(i_k)$ is the coded absolute elevation, where k=1 or 2. This coding may be carried out by searching for the 2 nearest neighbors in the determined elevation dictionary of $N_\phi$ levels (E203-1). Preferentially, the exhaustive search in the elevation scalar dictionary will be replaced by direct determination of the elevation index $i_1$ by a rounding:

$$i_1 = \min\left(\left[\frac{|\phi|}{\delta_\phi}\right], N_\phi - 1\right)$$

$$i_1 \leftarrow \arg\min_{i=N_\phi-1,N_\phi-2} \left||\phi| - \hat{\phi}(i)\right|, \text{ if } i_1 \geq N_\phi - 1$$

The last step is necessary here because, in the preferred embodiment: $\hat{\phi}(i)=i\delta_\phi$ is adopted for i=0, . . . , $N_\phi-2$ and $\hat{\phi}(i)=90$ is adopted for $i=N_\phi-1$ The quantization step is thus uniform only over the interval $[-(N_\phi-2)\delta_\phi, (N_\phi-2)\delta_\phi]$. For the codewords of index $i=N_\phi-1$, $N_\phi-2$, an explicit nearest neighbor search is required.

In some variants where the step is uniform over [−90, 90] degrees, it is possible to take:

$$i_1 = \left[\frac{|\phi|}{\delta_\phi}\right]$$

With $\delta_\phi=90/(N_\phi-1)$, knowing that:

$$\hat{\phi}(i) = \frac{i}{N_\phi - 1}90, \; i = 0, \ldots, N_\phi - 1$$

The index $i_2$ may be determined as described above in the MASA method from the prior art, namely:

$$i_2 = 1 \text{ if } i_1 = 0$$

$$i_2 = N_\phi - 2 \text{ if } i_1 = N_\phi - 1$$

$$i_2 = \arg\min_{i=i_1-1,i_1+1} \left||\phi| - \hat{\phi}(i)\right| \text{ if } 0 < i_1 < N_\phi - 1$$

It should be noted in all cases that the values $i_1$ and $i_2$ may be swapped without this changing the result of the coding.

The azimuth θ is coded by way of uniform scalar quantization in E204-2 with an adaptive number of levels $N_\theta(i)$ where $i=i_1$ or $i_2$, determined according to the exemplary embodiments described in the MASA method from the prior art (E203-2), in order to obtain, in E204-2, the two values $\hat{\theta}(i_1, j_1)$, $\hat{\theta}(i_2, j_2)$, respectively. More specifically, it is possible to take:

$$j_k = \text{mod}_{N_\theta(i_k)}\left\lfloor\frac{\theta - \Delta + 180/N_\theta(i_k)}{360/N_\theta(i_k)}\right\rfloor$$

This therefore gives two candidates $(sgn_\phi\cdot\hat{\phi}(i_k), \hat{\theta}(i_k, j_k))$ in step E205.

In step E206, the closest candidate (φ, θ) is selected according to k, for example as in the MASA method from the prior art.

$$d(i_k, s_k, j_k) = -\left(\sin\phi\,\sin\hat{\phi}(i_k) + \cos\phi\cos\hat{\phi}(i_k)\cos\left(\theta - \hat{\theta}(i_k, j_k)\right)\right)$$

The closest pair $(sgn_\phi\cdot\hat{\phi}(i_k), \hat{\theta}(i_k, j_k))$ is selected as quantized value to be indexed. This selected point is denoted $(sgn_\phi\cdot\hat{\phi}(id_\phi), \hat{\theta}(id_\phi, id_\theta))$.

In some variants, the distance criterion may be evaluated by converting the points into Cartesian coordinates in order to evaluate the Euclidean distance that is to be minimized or the scalar product that is to be maximized.

The quantization indices selected in E206 correspond to the selected point:

$$\left(sgn_\phi\cdot\hat{\phi}(id_\phi), \hat{\theta}(id_\phi, id_\theta)\right).$$

The indexing step E207 consists, based on the information $sgn_\phi$, $id_\phi$ and $id_\theta$, in determining a unique index $0 \leq index < N_{tot}$ to be transmitted.

In this step, a global quantization index is determined on the basis of the separate indices resulting from the separate quantization of the spherical coordinates for the selected closest point.

Figure 6B:
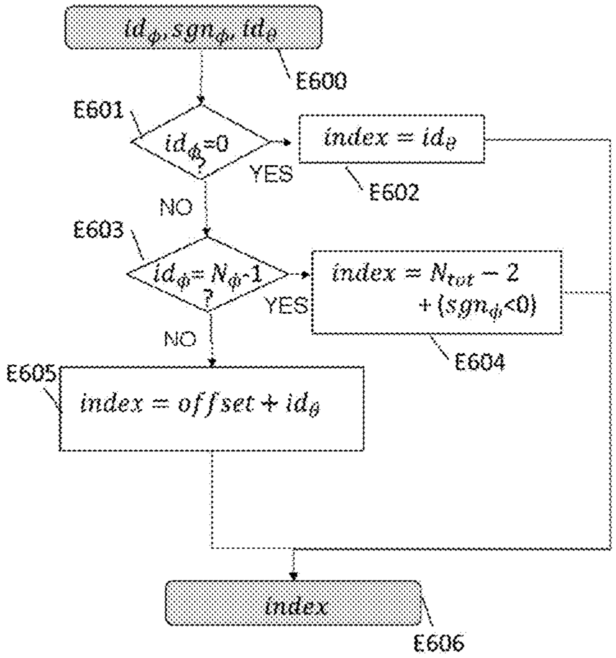
FIG. 6*b* illustrates the indexing step implemented in the coding method according to one embodiment of the invention, in the form of a flowchart.

This step is now described with reference to FIG. 6*b*, showing one exemplary embodiment. Based on the information $sgn_\phi$, $id_\phi$ and $id_\theta$, in E600, the value of $id_\phi$ is tested in E601 and E603.

if $id_\phi=0$ in E601, then index$=id_\theta$ (E602)

or if $id_\phi=N_\phi-1$ in E603, then index$=N_{tot}-2+(sgn_\phi<0)$ (E604)

In other cases, $$\text{index} = \text{offset} + id_\theta \quad \text{(E605)}$$

With $$\text{offset} = N_\theta(0) + 2Arr_{id_\phi}\left(\frac{N'_{tot}}{2}\frac{\sin\left(\left(i+\frac{1}{2}\right)\delta_\phi\right)-\sin\left(\frac{\delta_\phi}{2}\right)}{\sin\left(\left(N_\phi-\frac{1}{2}\right)\delta_\phi\right)-\sin\left(\frac{\delta_\phi}{2}\right)}\right) - \begin{cases} 2N_\theta(id_\phi) & \text{if } sgn_\phi > 0 \\ N_\theta(id_\phi) & \text{if } sgn_\phi < 0 \end{cases}$$

It will be recalled here that the term $$N_\theta(0) + 2Arr_{id_\phi}\left(\frac{N'_{tot}}{2}\frac{\sin\left(\left(id_\phi+\frac{1}{2}\right)\delta_\phi\right)-\sin\left(\frac{\delta_\phi}{2}\right)}{\sin\left(\left(N_\phi-\frac{1}{2}\right)\delta_\phi\right)-\sin\left(\frac{\delta_\phi}{2}\right)}\right)$$

corresponds to the cumulative cardinality of the spherical grid up to and including elevation layer i (with the layers in the Northern and Southern hemispheres, and with the equator).

The index of a point (codeword) in elevation layer i being of the form:

$$\text{index} = \text{offset} + id_\theta$$

the value of offset must therefore correspond to the cumulative cardinality up to the first point (codeword)—exclusive—of elevation layer i. In addition, the positive elevation layer i (Northern hemisphere) comes, by convention, before the negative elevation layer i, but these two layers have the same number of points $N_\theta(i)$.

The value offset is thus given by the cumulative cardinality including these positive and negative layers of index i, but subtracting either $2N_\theta(i)$ when it is the positive layer or $N_\theta(i)$ when it is the negative layer.

For the coding of a point (or codeword) in this same layer, it is possible, as an equivalent, to define:

$$\text{offset} = N_\theta(0) + 2Arr_{id_\phi}\left(\frac{N'_{tot}}{2}\frac{\sin\left(\left(id_\phi-\frac{1}{2}\right)\delta_\phi\right)-\sin\left(\frac{\delta_\phi}{2}\right)}{\sin\left(\left(N_\phi-\frac{1}{2}\right)\delta_\phi\right)-\sin\left(\frac{\delta_\phi}{2}\right)}\right) + \begin{cases} 0 & \text{if } sgn_\phi > 0 \\ N_\theta(id_\phi) & \text{if } sgn_\phi < 0 \end{cases}$$

Here, the term $$N_\theta(0) + 2Arr_{id_\phi}\left(\frac{N'_{tot}}{2}\frac{\sin\left(\left(id_\phi-\frac{1}{2}\right)\delta_\phi\right)-\sin\left(\frac{\delta_\phi}{2}\right)}{\sin\left(\left(N_\phi-\frac{1}{2}\right)\delta_\phi\right)-\sin\left(\frac{\delta_\phi}{2}\right)}\right)$$

gives the cumulative cardinality up to the elevation layer of index i−1. This value corresponds directly to the value offset for the positive elevation layer of index i, and must be corrected by $N_\theta(id_\phi)$ for the negative layer of index i.

According to the invention, this analytical method for determining the value offset gives the same result as the following sum, but with reduced complexity because the determination is more direct when $N_\phi$ is high (for example $N_\phi=122$):

$$\text{offset} = N_\theta(0) + 2\sum_{i=1}^{id_\phi-1} N_\theta(i) - \begin{cases} 2N_\theta(id_\phi) & \text{if } sgn_\phi > 0 \\ N_\theta(id_\phi) & \text{if } sgn_\phi < 0 \end{cases}$$

and $$\text{offset} = N_\theta(0) + 2\sum_{i=1}^{id_\phi-2} N_\theta(i) + \begin{cases} 0 & \text{if } sgn_\phi > 0 \\ N_\theta(id_\phi) & \text{if } sgn_\phi < 0 \end{cases}$$

The global index index is thus obtained in E606, through separate coding of the separate quantization indices $sgn_\phi$, $id_\phi$ and $id_\theta$ of the best candidate and through the use of the corresponding cumulative cardinality values.

It should be noted that the determination of the value offset is described here for the interval $N_\theta(0)\le\text{index}<N_{tot}-2$. In some variants, the interval in question will be able to be divided into sub-intervals of indices, and the value of offset will be able to be determined either analytically or by direct summing, with $N_\theta(i)$ defined according to the invention, according to the sub-interval under consideration.

In one embodiment, it will be possible to use pre-storage (tabulation) of the cumulative cardinality values offset according to $id_\phi$ and $sgn_\phi$, which gives (analytically or by direct summing) the result of the cumulative sum of cardinalities of successive spherical layers (or "sets of horizontal slices"). This sum may be interpreted as the cardinality of a spherical zone (the number of points of the partial grid ranging from the elevation of index 0 to the elevation of index i, alternating between Northern and Southern hemisphere).

In some variants, it will be possible not to store the values offset according to $id_\phi$ and $sgn_\phi$, but to compute them "online" (on the fly) based on the definition of offset as the cumulative sum of $N_\theta(i)$ with the correction on the basis of $id_\phi$ and $sgn_\phi$.

However, this adds computational complexity that may be non-negligible if the grid contains a large number of elevation levels ($N_\phi$ high).

In some variants, it will be possible to replace offset using the definition of cumN' and taking into account the fact that the cardinality in this case corresponds to a hemisphere.

Figure 2:
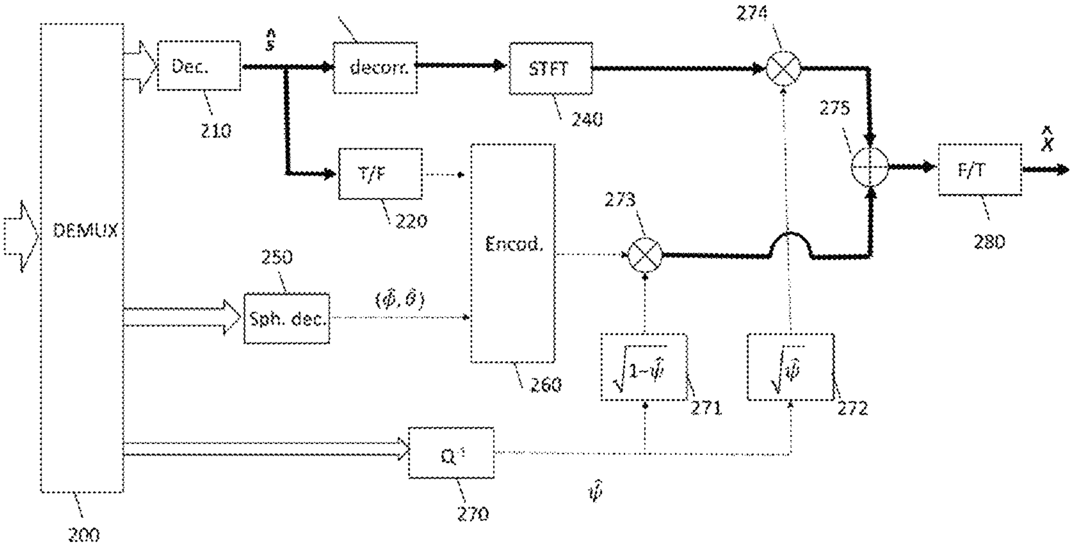
FIG.2 (prior art)
FIG. 2, described above, illustrates a DiRAC decoding device with decoding of spherical data in dimension 3.

The corresponding decoding method is now described with reference to FIG. 7*a*. This decoding method may be implemented, in one embodiment, by block 321 from FIG. 3 for the MASA data format or in block 250 from FIG. 2 for a DiRAC decoder.

Like for the coding, the spherical quantization dictionary is defined on a 3D sphere by an elevation decoding and an azimuth decoding. This spherical quantization dictionary is illustrated and described with reference to FIGS. 5*a* and 5*b* above.

In the same way as for the coding, the elevation decoding uses a scalar quantization, giving at least one decoded elevation index (i) on a number of elevation levels ($N_\phi$), the azimuth decoding uses a scalar quantization, according to a number of points per level ($N_\theta(i)$) depending on the decoded elevation index (i), the number of points per level ($N_\theta(i)$) is determined on the basis of two successive cumulative cardinality values (cumN(i), cumN(i−1)), the cumulative cardinality value (cumN(i)) for a decoded elevation index (i) being representative of a number of points proportional to a total number of points and according to the area of a spherical zone comprising at least one zone delimited by the upper horizontal plane $$\left(\phi = \left(i + \frac{1}{2}\right)\delta_\phi\right)$$

of the positive elevation level of the decoded elevation index (i) and a lower horizontal plane of the sphere.

First of all, indexing described with reference to FIG. 6*b* is assumed.

Figure 7A:
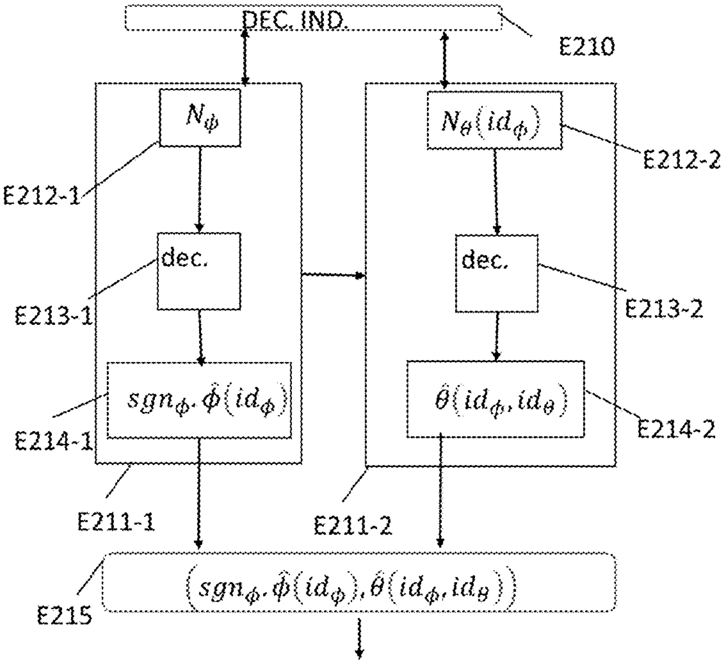
FIG. 7*a* illustrates the steps implemented in a decoding method according to one embodiment of the invention, in the form of flowcharts.

Given the global index index in step E210 of FIG. 7*a*, separate decoding of the two spherical coordinates is carried out in steps E211-1 and E211-2.

In step E212-1, as in coding step E203-1, a number of scalar quantization levels $N_\phi$ is determined. In the main embodiment, this step is tantamount to simply setting $N_\phi=122$.

The decoding of the elevation information $sgn_\phi$, $id_\phi$ is in E213-1. This step is detailed later with reference to FIG. 7*b*. Preferably, this decoding uses an analytical estimate of the index $id_\phi$. In some variants, $sgn_\phi$, $id_\phi$ may be decoded by searching the cardinality table computed on the fly or stored or using other methods that give an identical result.

The decoded elevation is reconstructed in E214-1 as $sgn_\phi \cdot \hat{\phi}(id_\phi)$ where $$\mathrm{sgn}_\phi \cdot \hat{\phi}(i) = \mathrm{sgn}_\phi \cdot i\delta_\phi \text{ for } i = 0, \ldots, N_\phi - 2 \text{ and}$$

$$\mathrm{sgn}_\phi \cdot \hat{\phi}(i) = \mathrm{sgn}_\phi \cdot 90 \text{ for } i = N_\phi - 1$$

In some variants, other uniform or non-uniform quantization dictionaries $\{\hat{\phi}(i)\}$ will be possible, in a manner identical to the coding.

The decoding of the azimuth index $id_\theta$ is in E213-2. This step is detailed later with reference to FIG. 7*b*. The index $id_\theta$ of the azimuth is obtained in the general case by subtraction according to the following formula: $id_\theta$=index-offset based on the global index index and the decoded elevation information $sgn_\phi$ and $id_\phi$, but some special cases ($id_\phi=0$ and $id_\phi=N_\phi-1$) are defined in FIG. 7*b*.

The value of the offset is determined as defined in the coding, and the azimuth $\hat{\theta}$ ($id_\phi$, $id_\theta$) is reconstructed in E214-2 as:

$$\hat{\theta}(i, j) = \begin{cases} 360j/N_\theta(i) - 180 & i \text{ even} \\ 360(i + 0.5)/N_\theta(i) - 180 & i \text{ odd} \end{cases}$$

This gives in particular $\hat{\theta}$ ($id_\phi=N_\phi-1$, $id_\theta=0$)=−180 with $N_\theta(id_\phi=N_\phi-1)=1$. This thus gives the spherical coordinates ($\hat{\phi}$(i), $\hat{\theta}$(i, j)) of the decoded point in E215.

Figure 7B:
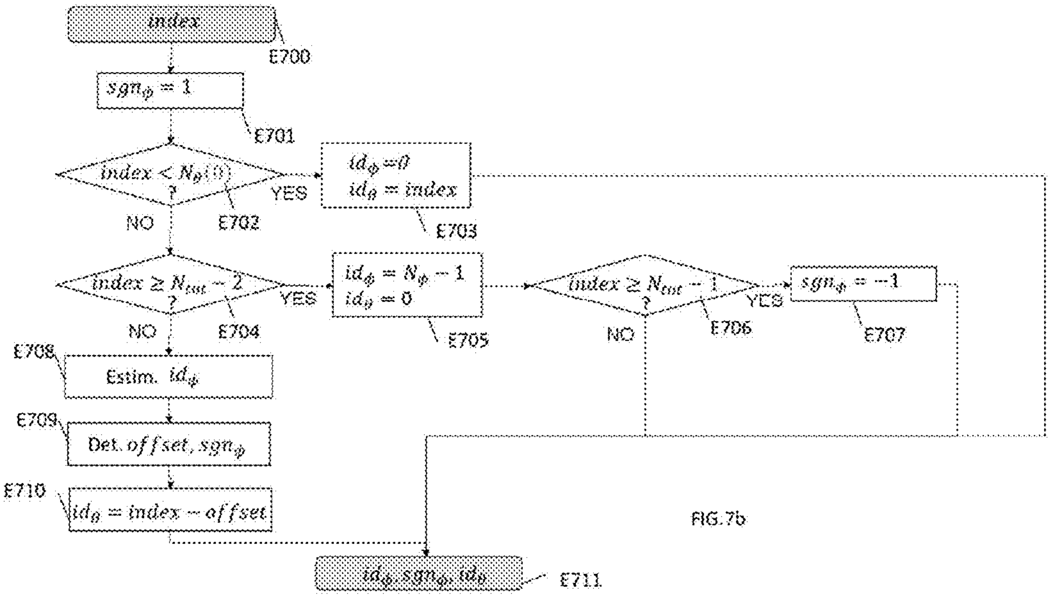
FIG. 7*b* illustrates the steps of decoding the quantization indices implemented in the decoding method according to one embodiment of the invention, in the form of a flowchart.

Steps E213-1 and E213-2 are detailed together in FIG. 7*b*.

Based on the global index $0 \le index < N_{tot}$ to be decoded (E700), the sign information $sgn_\phi=1$ is set by default (E701). If the index satisfies $index < N_\theta(0)$, this indicating that it is a point on the equator (E702), direct decoding is carried out:

$id_\theta$=index and $id_\phi=0$ is set (E703).

Otherwise, if the index satisfies $index \ge N_{tot}-2$, this indicating that it is a point on the North or South pole (E704), direct decoding is carried out:

$id_\phi=N_\phi-1$, $id_\theta=0$ (E705). The sign $sgn_\phi$ is corrected from its default value to −1 (E707) if $index=N_{tot}-1$ in E706, because the indices are ordered by elevation layers alternating between Northern hemisphere and Southern hemisphere, so $index=N_{tot}-2$ corresponds to the North pole ($sgn_\phi=1$) and $index=N_{tot}-1$ corresponds to the South pole ($sgn_\phi=-1$).

Otherwise, in the other cases ($N_\theta(0) \le index < N_{tot}-2$), in one preferred embodiment, the index $id_\theta$ is for example estimated by inverting the analytical computation carried out in step E605 of FIG. 6*b*.

It is possible to estimate $id_\phi$ as:

$$id_\phi = \left[\frac{1}{\delta_\phi}\arcsin(x)\right]$$

$$\text{Where } x = \left(\text{index} - N_\theta(0) - 2 - \frac{1}{2}\right)\frac{2\left(\sin\left(\left(N_\phi - \frac{1}{2}\right)\delta_\phi\right) - \sin\left(\frac{\delta_\phi}{2}\right)\right)}{N'_{tot}} + \sin\left(\frac{\delta_\phi}{2}\right)$$

and [•] is the rounding to the nearest integer.

In some variants, an approximation of the arcsine function is used.

The following is adopted (in E708):

$$id_\phi = \left[\frac{1}{\delta_\phi}\left(\frac{\pi}{2} - \sqrt{1 - x} \cdot P(x)\right)\right]$$

where $$P(x) = 1.57078786 + x\,(-0.21412453 + x\,(0.08466649 + x\,(-0.03575663 + 0.008648884 \cdot x)))$$

is a polynomial of degree 4.

In some variants, other approximations of the arcsine function may be used, in particular other polynomials P(x) of a different degree may be used.

It should be noted that the estimate of $id_\phi$ used above has the noteworthy property of being accurate to within an overestimate of $id_\phi$ by one unit—in general, it gives the correct value of $id_\phi$, and if not, $id_\phi$ is underestimated by one unit.

In some variants, other estimates of $id_\phi$ (exact or to within a value) may be used.

In the preferred embodiment, the decoding (E709) is then carried out as follows based on the estimate of $id_\phi$ by inverting the arcsine function or based on an approximation. An initial value is determined for:

$$\text{offset}_{init} = N_\theta(0) + 2Arr_{id_\phi}\left(\frac{N'_{tot}}{2}\,\frac{\sin\left(\left(id_\phi + \frac{1}{2}\right)\delta_\phi\right) - \sin\left(\frac{\delta_\phi}{2}\right)}{\sin\left(\left(N_\phi - \frac{1}{2}\right)\delta_\phi\right) - \sin\left(\frac{\delta_\phi}{2}\right)}\right)$$

In some variants, it will be possible to compute, in an equivalent manner (with the same result):

$$\text{offset}_{init} = N_\theta(0) + 2\sum_{i=1}^{id_\phi} N_\theta(i)$$

Based on this initial value $\text{offset}_{init}$, the values of $id_\phi$, $sgn_\phi$ and offset may then be determined as follows:

If $index \geq offset_{init}$, $id_\phi \leftarrow id_\phi+1$, $offset \leftarrow offset_{init}$, otherwise:

$$\text{offset} \leftarrow \text{offset}_{init} - N_\theta(id_\phi)$$

If $index \geq offset$: $sgn_\phi \leftarrow -1$

Otherwise: $offset \leftarrow offset - N_\theta(id_\phi)$

Where a←b indicates that the existing value of a is replaced by the result of the expression b.

The step of correcting $id_\phi \leftarrow id_\phi+1$ when $index \geq offset_{init}$ is specific to the exemplary embodiment of estimating $id_\phi$ by inverting the arcsine function. If this step is carried out, the value of $offset_{init}$ corresponds to the cumulative cardinality of the grid up to the lower layer $id_\phi-1$.

Otherwise, if this step of correcting $id_\phi$ is not carried out, the value of $offset_{init}$ corresponds to the cumulative cardinality of the grid up to the elevation layer $id_\phi$. The justification of the steps of correcting the value $offset_{init}$ in the form $offset-N_\theta(id_\phi)$ is detailed with reference to FIGS. 8*a* and 8*b* described below.

In some variants, it will be possible to define, as initial value $offset_{init}$, the cumulative cardinality for the lower elevation layer of index i−1 and correct the value of $offset_{init}$ equivalently. The initial value is given by:

$$\text{offset}_{init} = N_\theta(0) + 2Arr_{id_\phi}\left(\frac{N'_{tot}}{2}\frac{\sin\left(\left(id_\phi - \frac{1}{2}\right)\delta_\phi\right) - \sin\left(\frac{\delta_\phi}{2}\right)}{\sin\left(\left(N_\phi - \frac{1}{2}\right)\delta_\phi\right) - \sin\left(\frac{\delta_\phi}{2}\right)}\right)$$

Based on this initial value $offset_{init}$, the values of $id_\phi$, $sgn_\phi$ and offset may then be determined as follows:

If $index \geq offset_{init}+2N_\theta(id_\phi)$, $id_\phi \leftarrow id_\phi+1$, $offset \leftarrow offset_{init}$, otherwise:

If $index \geq offset_{init}+N_\theta(id_\phi)$: $sgn_\phi \leftarrow -1$ and $offset \leftarrow offset_{init}+N_\theta(id_\phi)$ Otherwise: $offset \leftarrow offset_{init}$, Where a←b indicates that the existing value of a is replaced by the result of the expression b. In this case, the steps of correcting the value $offset_{init}$ are in the form $offset_{init}+N_\theta(id_\phi)$.

In some variants, it will be possible to adapt the principle of correcting the value of $id_\phi$ and of $offset_{init}$ according to the method for estimating $id_\phi$, in order to determine the values of $id_\phi$, $sgn_\phi$ and offset.

In some variants where the cumulative cardinality is defined differently, with corresponding values $N_\theta(i)$, the analytical definition of the initial estimate of offset will be adapted.

In some variants, other integer and exact estimates (giving the same results) of $id_\phi$ and other direct or indirect methods for determining $id_\phi$, $sgn_\phi$ and offset will be able to be used, as long as they do not change the decoding result. Indeed, since the values of $id_\phi$ and offset are integers, the sign $sgn_\phi$ being able to be seen as a signed integer, alternative methods may be implemented, as long as they give identical values for $id_\phi$, $sgn_\phi$ and offset.

One example of a decoding variant for $id_\phi$, $sgn_\phi$, and offset that is of only little interest but that has the merit of illustrating one example of an alternative method would consist in simply exhaustively running through all possible values $id_\phi$, $sgn_\phi$ and $id_\phi$ and in computing the corresponding index as at the encoder and in selecting the combination that leads exactly to $index=offset+id_\theta$.

The decoding of the index is deterministic in the sense that, for a given value index, the values $id_\phi$, $sgn_\phi$ and $id_\phi$ are unique and are integers.

In all cases, the decoding of $id_\phi$, $sgn_\phi$ and offset relies on the values of $N_\theta(i)$ according to the invention with the possibility of analytically determining a cumulative cardinality.

Finally, decoding $id_\theta$ (E710) is tantamount simply to subtracting the decoded cumulative cardinality value (offset) from the received global index (index):

$$id_\theta = \text{index} - \text{offset}$$

In some variants, it will be possible to replace offset using the definition of cumN' and taking into account the fact that the cardinality in this case corresponds to a hemisphere.

Figure 8A:
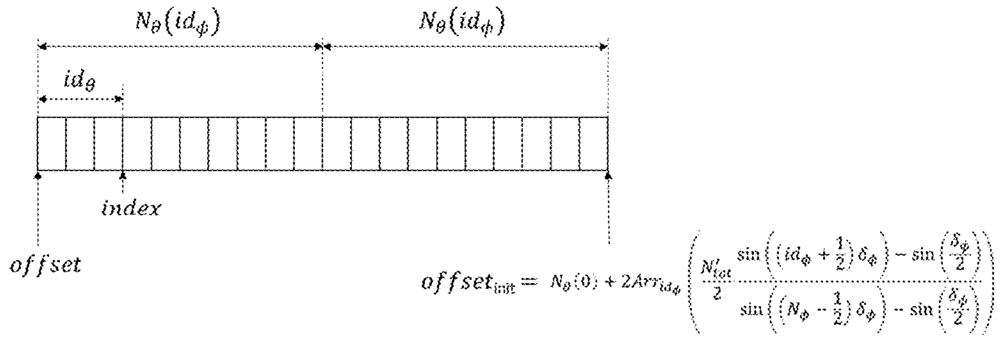
FIG. 8*a* illustrates the indexing (in the Northern hemisphere of the 3D sphere) implemented in a decoding method according to one embodiment of the invention, in the form of a diagram.
Figure 8B:
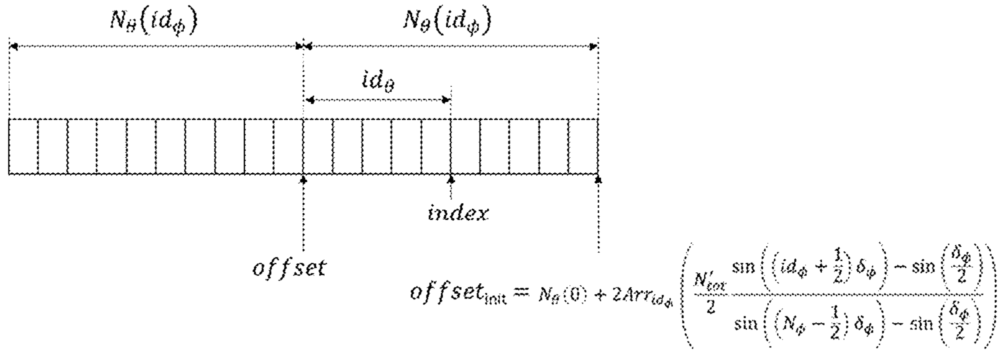
FIG. 8*b* illustrates the indexing (in the Southern hemisphere of the 3D sphere) implemented in a decoding method according to one embodiment of the invention, in the form of a diagram.

FIGS. 8*a* and 8*b* illustrate the coding and decoding of the index according to the embodiment of the invention.

FIG. 8*a* corresponds to the case of coding or decoding of a point in the Northern hemisphere (excluding equator and pole) of the grid according to the invention, while FIG. 8*b* corresponds to the case of coding or decoding of a point in the Southern hemisphere (excluding equator and pole). In this example, $N_\phi=122$, $id_\phi=120$, and $sgn_\phi=1$, $id_\theta=3$, index=65517 in FIG. 8*a* and $sgn_\phi=-1$, $id_\theta=5$, index=65529 in FIG. 8*b*. In this example, $N_\theta(id_\phi)=10$ and the initial value of $offset_{init}$ is:

$$\text{offset}_{init} = N_\theta(0) + 2Arr_{id_\phi}\left(\frac{N'_{tot}}{2}\frac{\sin\left(\left(id_\phi + \frac{1}{2}\right)\delta_\phi\right) - \sin\left(\frac{\delta_\phi}{2}\right)}{\sin\left(\left(N_\phi - \frac{1}{2}\right)\delta_\phi\right) - \sin\left(\frac{\delta_\phi}{2}\right)}\right)$$

thereby giving, in this example: $offset_{init}=65534$.

In FIG. 8*a*, the decoding of index=65517 gives rise to the following correction:

If $index \geq offset_{init}$, $id_\phi \leftarrow id_\phi+1$, $offset \leftarrow offset_{init}$ otherwise:

$offset \leftarrow offset_{init}-N_\theta(id_\phi)$

If $index \geq offset$: $sgn_\phi \leftarrow -1$

Otherwise: $offset \leftarrow offset-N_\theta(id_\phi)$

Thereby resulting in the value of offset being corrected by $offset \leftarrow offset_{init}-2N_\theta(id_\phi)$ and giving offset=65514.

In FIG. 8*b*, the decoding of index=65529 gives rise to the following correction:

If $index \geq offset_{init}$, $id_\phi \leftarrow id_\phi+1$, $offset \leftarrow offset_{init}$, otherwise:

$offset \leftarrow offset_{init}-N_\theta(id_\phi)$

If $index \geq offset$: $sgn_\phi \leftarrow -1$

Otherwise: $offset \leftarrow offset-N_\theta(id_\phi)$

Thereby resulting in the value of offset being corrected by $offset \leftarrow offset_{init}-N_\theta(id_\phi)$ and giving offset=65524.

In some variants, the value of $offset_{init}$ may correspond to the cumulative cardinality up to the lower elevation layer, or it may be obtained by a direct sum based on the values $N_\theta(i)$ according to the invention.

In some variants where the cumulative cardinality is defined differently, with corresponding values $N_\theta(i)$, the analytical definition of the initial estimate of $offset_{init}$ will be adapted.

Figure 9:
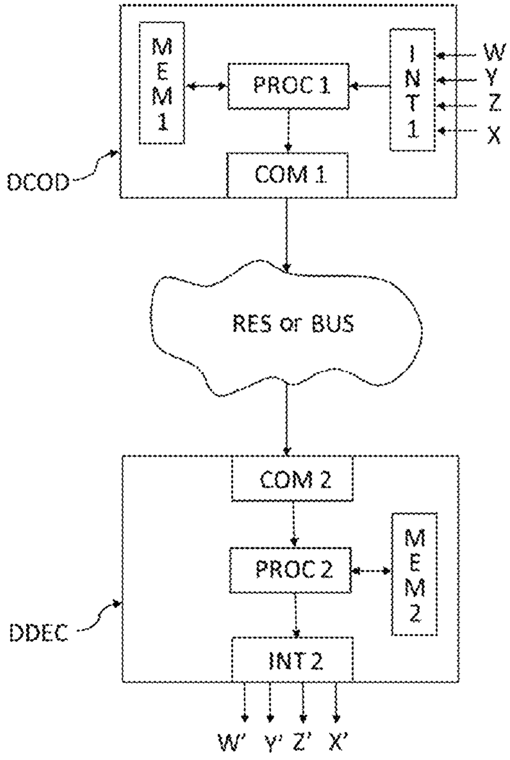
FIG. 9 illustrates examples of structural embodiments of a coding device and of a decoding device according to one embodiment of the invention.

FIG. 9 illustrates a coding device DCOD and a decoding device DDEC, within the sense of the invention, these devices being dual to one another (in the sense of "reversible") and connected to one another by a communication network RES or an internal bus BUS in a terminal (for communication between a MASA analysis module and an IVAS codec or another processing operation).

The coding device DCOD comprises a processing circuit typically including:

- a memory MEM1 for storing instruction data of a computer program within the sense of the invention (these instructions possibly being distributed between the encoder DCOD and the decoder DDEC);
- an interface INT1 for receiving an original multichannel signal B, for example a signal distributed over various channels or a parametric version in compression with source direction parameters within the sense of the invention;
- a processor PROC1 for receiving this signal and processing it by executing the computer program instructions stored in the memory MEM1, with a view to coding it; and
- a communication interface COM1 for transmitting the coded signals via the network or an internal bus of a terminal.

The decoding device DDEC comprises its own processing circuit, typically including:

- a memory MEM2 for storing instruction data of a computer program within the sense of the invention (these instructions possibly being distributed between the encoder DCOD and the decoder DDEC as indicated above);
- an interface COM2 for receiving the coded signals from the network RES or from an internal bus BUS with a view to compression-decoding them within the sense of the invention;
- a processor PROC2 for processing these signals by executing the computer program instructions stored in the memory MEM2, with a view to decoding them; and
- an output interface INT2 for delivering source direction parameters.

Of course, this FIG. 9 illustrates one example of a structural embodiment of a codec (encoder or decoder) within the sense of the invention. FIGS. 5 to 8, commented on above, describe more functional embodiments of these codecs in detail.

Although the present disclosure has been described with reference to one or more examples, workers skilled in the art will recognize that changes may be made in form and detail without departing from the scope of the disclosure and/or the appended claims.

The invention claimed is:

1. A method implemented by a coding device and comprising:

- receiving a spatial direction parameter of a sound source in a sound scene;
- coding the received spatial direction parameter of a sound source, the spatial direction parameter being defined by spherical coordinates comprising an elevation coordinate and an azimuth coordinate, wherein a spherical quantization dictionary is defined on a 3D sphere by an elevation coding and an azimuth coding, and wherein:
  - the elevation coding uses a scalar quantization, giving at least one coded elevation index (i) on a number of elevation levels ($N_\phi$),
  - the azimuth coding uses a scalar quantization, according to a number of points per level ($N_\theta(i)$) depending on the coded elevation index (i),
  - the number of points per level ($N_\theta(i)$) is determined on the basis of two successive cumulative cardinality values (cumN(i), cumN(i−1)),
  - the cumulative cardinality value (cumN(i)) for a coded elevation index (i) being representative of a number of points proportional to a total number of points and according to the area of a spherical zone comprising at least one zone delimited by an upper horizontal plane $$(\phi = (i + \frac{1}{2})\delta_\phi)$$

of a positive elevation level of the coded elevation index (i) and a lower horizontal plane of the 3D sphere; and
- obtaining a quantized spatial direction index based on the elevation coding and the azimuth coding.

2. The method as claimed in claim 1, wherein the elevation coding includes levels corresponding to the equator (0°) and to the poles (+/−90°) of the 3D sphere.

3. The method as claimed in claim 1, wherein a number of points ($N_\theta(0)$) for the azimuth coding is predetermined for the elevation level corresponding to the equator, and the total number of points $$(N'_{tot})$$

is obtained by subtracting, from a target number of points ($N_{tot}$)), the predetermined number of points corresponding to the equator and each of the North and South poles of the 3D sphere, according to the following expression:

$$N'_{tot} = N_{tot} - N_\theta(0) - 2N_\theta(N_\phi - 1),$$

- $N_{tot}$ being the target number of points of the 3D sphere for a given bit budget,
- $N_\theta(0)$, the predetermined number of points for the elevation level corresponding to the equator; and
- $2N_\theta(N_\phi-1)$ the predetermined number of points for the North and South poles of the 3D sphere.

4. The method as claimed in claim 3, wherein the cumulative cardinality value (cumN(i)) for a coded elevation index (i) is representative of a number of points proportional to the total number of points according to the area ($A_i$) of a spherical zone delimited by the upper horizontal plane $$(\phi = -(i + \frac{1}{2})\delta_\phi)$$

of the positive elevation level of the coded elevation index (i) and this same plane of the 3D sphere symmetrical with respect to the equator $$(\phi = (i + \frac{1}{2})\delta_\phi)$$

minus the area ($A_0$) corresponding to the elevation level of the equator, according to the following ratio:

$$\frac{(A_i - A_0)}{(A_{N_\phi-2} - A_0)} N'_{tot}$$

$N_\phi-2$ being the number of elevation quantization levels without the equator and the North and South poles of the 3D sphere and $A_{N_\phi-2}$, the area of the spherical zone corresponding to an elevation index $N_\phi-2$.

5. The method as claimed in claim 4, wherein the expression for the cumulative cardinality value is as follows:

$$cumN(i) = 2Arr_i\left(\frac{N'_{tot}}{2}\frac{\sin\left((i+\frac{1}{2})\delta_\phi\right)-\sin\left(\frac{\delta_\phi}{2}\right)}{\sin\left((N_\phi-\frac{1}{2})\delta_\phi\right)-\sin\left(\frac{\delta_\phi}{2}\right)}\right)$$

with $i=1, \ldots, N_\phi-2$, $N_\phi-2$ being the number of elevation quantization levels without the equator and the North and South poles of the 3D sphere, $Arr_i(\ )$ being a rounding to the nearest integer depending on i, $$2Arr_i\left(\frac{x}{2}\right)$$

corresponding to a rounding to an even integer and $\delta_\phi$ being a given quantization step of the elevation.

6. The method as claimed in claim 1, wherein the elevation coding gives a coded elevation index (i) on a number of elevation levels ($N_\phi$) and sign information.

7. The method as claimed in claim 1, wherein a global quantization index to be transmitted (index) is determined based on an azimuth index coded by scalar quantization on a determined number of points per level ($N_\phi(i)$) and a cumulative cardinality value obtained based on at least the coded elevation index.

8. A coding device comprising:

a processing circuit configured to:

receive a spatial direction parameter of a sound source in a sound scene;

code the received spatial direction parameter of a sound source, the spatial direction parameter being defined by spherical coordinates comprising an elevation coordinate and an azimuth coordinate, wherein a spherical quantization dictionary is defined on a 3D sphere by an elevation coding and an azimuth coding, and wherein:

the elevation coding uses a scalar quantization, giving at least one coded elevation index (i) on a number of elevation levels ($N_\phi$), the azimuth coding uses a scalar quantization, according to a number of points per level ($N_\phi(i)$) depending on the coded elevation index (i), the number of points per level ($N_\theta(i)$) is determined on the basis of two successive cumulative cardinality values (cumN(i), cumN(i−1)), the cumulative cardinality value (cumN(i)) for a coded elevation index (i) being representative of a number of points proportional to a total number of points and according to the area of a spherical zone comprising at least one zone delimited by an upper horizontal plane $$(\phi = (i + \frac{1}{2})\delta_\phi)$$

of a positive elevation level of the coded elevation index (i) and a lower horizontal plane of the 3D sphere; and obtain a quantized spatial direction index based on the elevation coding and the azimuth coding.

9. The coding device as claimed in claim 8, wherein the elevation coding includes levels corresponding to the equator (0°) and to the poles (+/−90°) of the 3D sphere.

10. The coding device as claimed in claim 8, wherein a number of points ($N_\theta(0)$) for the azimuth coding is predetermined for the elevation level corresponding to the equator, and the total number of points $$(N'_{tot})$$

is obtained by subtracting, from a target number of points ($N_{tot}$), the predetermined number of points corresponding to the equator and each of the North and South poles of the 3D sphere, according to the following expression:

$$N'_{tot} = N_{tot} - N_\theta(0) - 2N_\theta(N_\phi - 1),$$

$N_{tot}$ being the target number of points of the 3D sphere for a given bit budget, $N_\theta(0)$, the predetermined number of points for the elevation level corresponding to the equator; and $2N_\theta(N_\phi-1)$ the predetermined number of points for the North and South poles of the 3D sphere.

11. The coding device as claimed in claim 10, wherein the cumulative cardinality value (cumN(i)) for a coded elevation index (i) is representative of a number of points proportional to the total number of points according to the area ($A_i$) of a spherical zone delimited by the upper horizontal plane $$(\phi = (i + \frac{1}{2})\delta_\phi)$$

of the positive elevation level of the coded elevation index (i) and this same plane of the 3D sphere symmetrical with respect to the equator $$(\phi = (i + \frac{1}{2})\delta_\phi)$$

minus the area ($A_0$) corresponding to the elevation level of the equator, according to the following ratio:

$$\frac{(A_i - A_0)}{(A_{N_\phi-2} - A_0)} N'_{tot}$$

$N_\phi-2$ being the number of elevation quantization levels without the equator and the North and South poles of the 3D sphere and $A_{N_\phi-2}$, the area of the spherical zone corresponding to an elevation index $N_\phi-2$.

12. The coding device as claimed in claim 11, wherein the expression for the cumulative cardinality value is as follows:

$$cumN(i) = 2Arr_i\left(\frac{N'_{tot}}{2}\frac{\sin\left((i+\frac{1}{2})\delta_\phi\right)-\sin\left(\frac{\delta_\phi}{2}\right)}{\sin\left((N_\phi-\frac{1}{2})\delta_\phi\right)-\sin\left(\frac{\delta_\phi}{2}\right)}\right)$$

with $i=1, \ldots, N_\phi-2$, $N_\phi-2$ being the number of elevation quantization levels without the equator and the North and South poles of the 3D sphere, $Arr_i(\ )$ being a rounding to the nearest integer depending on i, $$2Arr_i\left(\frac{x}{2}\right)$$

corresponding to a rounding to an even integer and $\delta_\phi$ being a given quantization step of the elevation.

13. The coding device as claimed in claim 8, wherein the elevation coding gives a coded elevation index (i) on a number of elevation levels ($N_\phi$) and sign information.

14. The coding device as claimed in claim 8, wherein a global quantization index to be transmitted (index) is determined based on an azimuth index coded by scalar quantization on a determined number of points per level ($N_\theta(i)$) and a cumulative cardinality value obtained based on at least the coded elevation index.

15. A non-transitory storage medium able to be read by at least one processor of the coding device and storing a computer program comprising instructions for executing the method as claimed in claim 1 when the instructions are executed by the at least one processor.

* * * * *